US009695682B2

(12) United States Patent
Munisteri

(10) Patent No.: US 9,695,682 B2
(45) Date of Patent: Jul. 4, 2017

(54) USE OF IONIZED FLUID IN HYDRAULIC FRACTURING

(71) Applicant: MBL Water Partners, LLC, Houston, TX (US)

(72) Inventor: Joseph G. Munisteri, Houston, TX (US)

(73) Assignee: MBL Water Partners, LLC

(*) Notice: Subject to any disclaimer, the term of this patent is extended or adjusted under 35 U.S.C. 154(b) by 0 days.

(21) Appl. No.: 14/619,747

(22) Filed: Feb. 11, 2015

(65) Prior Publication Data

US 2015/0152721 A1 Jun. 4, 2015

Related U.S. Application Data

(63) Continuation of application No. 14/229,320, filed on Mar. 28, 2014, which is a continuation-in-part of
(Continued)

(51) Int. Cl.
| | | |
|---|---|---|
| C02F 1/00 | (2006.01) | |
| C09K 8/68 | (2006.01) | |
| G01N 27/26 | (2006.01) | |
| E21B 43/26 | (2006.01) | |
| E21B 43/18 | (2006.01) | |
| B01D 21/34 | (2006.01) | |
| C02F 1/48 | (2006.01) | |
| E21B 43/267 | (2006.01) | |
| E21B 21/06 | (2006.01) | |

(Continued)

(52) U.S. Cl.
CPC .............. *E21B 43/26* (2013.01); *B01D 21/34* (2013.01); *C02F 1/487* (2013.01); *C09K 8/84* (2013.01); *E21B 21/065* (2013.01); *E21B 43/18* (2013.01); *E21B 43/267* (2013.01); *E21B 43/40* (2013.01); *B01D 57/02* (2013.01); *C02F 2103/10* (2013.01); *C02F 2103/365* (2013.01); *C02F 2303/04* (2013.01); *C02F 2303/22* (2013.01)

(58) Field of Classification Search
None
See application file for complete search history.

(56) References Cited

U.S. PATENT DOCUMENTS 3,637,031 A * 1/1972 Hull et al. ................. 175/66
4,039,459 A * 8/1977 Fischer et al. ............ 507/102
(Continued)

FOREIGN PATENT DOCUMENTS

WO 2014018991 A3 1/2014

OTHER PUBLICATIONS

File History of Canadian National Phase Application No. 2,876,078, National Phase Entry of PCT/US2013/027429, filing date of Feb. 22, 2013, 14 pages.
(Continued)

*Primary Examiner* — Richard Gurtowski
(74) *Attorney, Agent, or Firm* — Karen B. Tripp

(57) ABSTRACT

A method and system for generating an ionized fluid, injecting the ionized fluid into fissures in a subterranean formation, pressurizing the ionized fluid, whereby the crystalline structure of a portion of the shale deposits located at the fissures are changed into suspended particles, whereby the depressurization of the ionized fluid forces the suspended particles out of the fissures, increasing the flow of hydrocarbons from those fissures.

11 Claims, 28 Drawing Sheets

Related U.S. Application Data application No. 14/095,346, filed on Dec. 3, 2013, which is a continuation of application No. 13/832,759, filed on Mar. 15, 2013, which is a continuation-in-part of application No. 13/594,497, filed on Aug. 24, 2012, now Pat. No. 8,424,784.

(51) Int. Cl.
```
C09K 8/84       (2006.01)
E21B 43/40      (2006.01)
B01D 57/02      (2006.01)
C02F 103/10     (2006.01)
C02F 103/36     (2006.01)
```

(56) References Cited

U.S. PATENT DOCUMENTS

| | | | | |
|---|---|---|---|---|
| 4,588,509 | A * | 5/1986 | Hyde et al. | 210/788 |
| 4,705,108 | A * | 11/1987 | Little | E21B 43/2401 |
| | | | | 166/248 |
| 6,063,267 | A * | 5/2000 | Crewson et al. | 210/143 |
| 2006/0083645 | A1 * | 4/2006 | Simmons | 417/555.1 |
| 2007/0000663 | A1 | 1/2007 | Kelley | |
| 2008/0017594 | A1 * | 1/2008 | Sarshar et al. | 210/787 |
| 2010/0206732 | A1 * | 8/2010 | Hale | 204/554 |
| 2012/0181014 | A1 * | 7/2012 | Daussin | E21B 43/267 |
| | | | | 166/90.1 |
| 2014/0083857 | A1 | 3/2014 | Munisteri | |
| 2015/0076073 | A1 * | 3/2015 | Henley | C02F 9/00 |
| | | | | 210/695 |
| 2015/0152721 | A1 | 6/2015 | Munisteri | |

OTHER PUBLICATIONS

Publication of Argentina Patent Application No. P13 01 02683, Patent Bulletin No. 819, Mar. 11, 2015, 1 page.
Decision granting request for prioritized examination, mailed Mar. 11, 2015, co-pending U.S. Appl. No. 14/619,747, 4 pages.
File history of Canadian National Phase Application No. 2,878,437 National Phase Entry of PCT/US2013/053125, filing date of Aug. 1, 2013, 15 pages.
File history of Chinese National Phase Application No. 201380048385.2, National Phase Entry of PCT/US2013/053125, filing date of Aug. 1, 2013, 82 pages.
Boyd, Danny, Solutions Improve Water Management, The American Oil and Gas Reporter, Mar. 2015, 2 pages, Houston, USA.
Russian National Phase Application No. 2015106839, National Phase Entry of PCT/US13/53125, filed Feb. 27, 2015, 90 pages.
File history of Australian National Phase Application No. 2013295478, National Phase Entry of PCT/US2013/053125, filing date of Aug. 1, 2013, 3 pages.
Office Action mailed Apr. 3, 2015 in co-pending U.S. Appl. No. 14/229,320, 81 pages.
Notification concerning transmittal of the International Preliminary Report on Patentability, mailed May 25, 2015, PCT/US2013/053125, 9 pages.
File history of Chinese National Phase Application No. 201380039861.4, National Phase Entry of PCT/US2013/027429, filing date of Feb. 22, 2013, 41 pages.
Office Action mailed Mar. 24, 2015 in co-pending U.S. Appl. No. 14/095,346, 25 pages.
Response to Office Action mailed Mar. 24, 2015, filed Jun. 24, 2015, co-pending U.S. Appl. No. 14/095,346, 17 pages.
Russian National Phase Application No. 2015105894, National Phase Entry of PCT/US2013/027429, filed Feb. 20, 2015, 51 pages.
File history of Australian National Phase Application No. 2013293548, National Phase Entry of PCT/US2013/027429, filing date of Feb. 22, 2013, 5 pages.
Filing Receipt of Mozambique National Phase Application No. 386/2015, National Phase Entry of PCT/US2013/027429, filed Feb. 19, 2015, 3 pages.
File history of European National Phase Application No. 13823090.9, National Phase Entry of PCT/US2013/027429, filing date of Feb. 22, 2013, 9 pages.
File history of European National Phase Application No. P13823075.0, National Phase Entry of PCT/US13/53125, filing date of Aug. 1, 2013, 7 pages.
File history of U.S. Prioritized U.S. Appl. No. 14/734,851, filed Jun. 9, 2015, 48 pages.
Publication of Chinese National Phase Application No. 201380039861.4, Publication No. CN104508237A, published Apr. 8, 2015, 25 pages.
Applicant initiated interview summary, mailed May 18, 2015, co-pending U.S. Appl. No. 14/095,346, 3 pages.
Filing Receipt of Mozambique National Phase Application No. 387/2015, National Phase Entry of PCT/US13/53125, filed Feb. 24 2015, 3 pages.
Notification concerning availability of the publication of the international application, mailed Jun. 26, 2015, PCT/US2013/053125, 1 page.
File history of co-pending U.S. Appl. No. 14/338,827, filed Jul. 23, 2014, 109 pages.
File history of co-pending U.S. Appl. No. 14/338,861, filed Jul. 23, 2014, 106 pages.
Filed response to Office Action filed Jul. 2, 2015 for Office Action mailed Apr. 3, 2015 in co-related U.S. Appl. No. 14/229,320, 15 pages.
Final Office Action mailed Jul. 15, 2015 in co-pending U.S. Appl. No. 14/095,346, 11 pages.

* cited by examiner

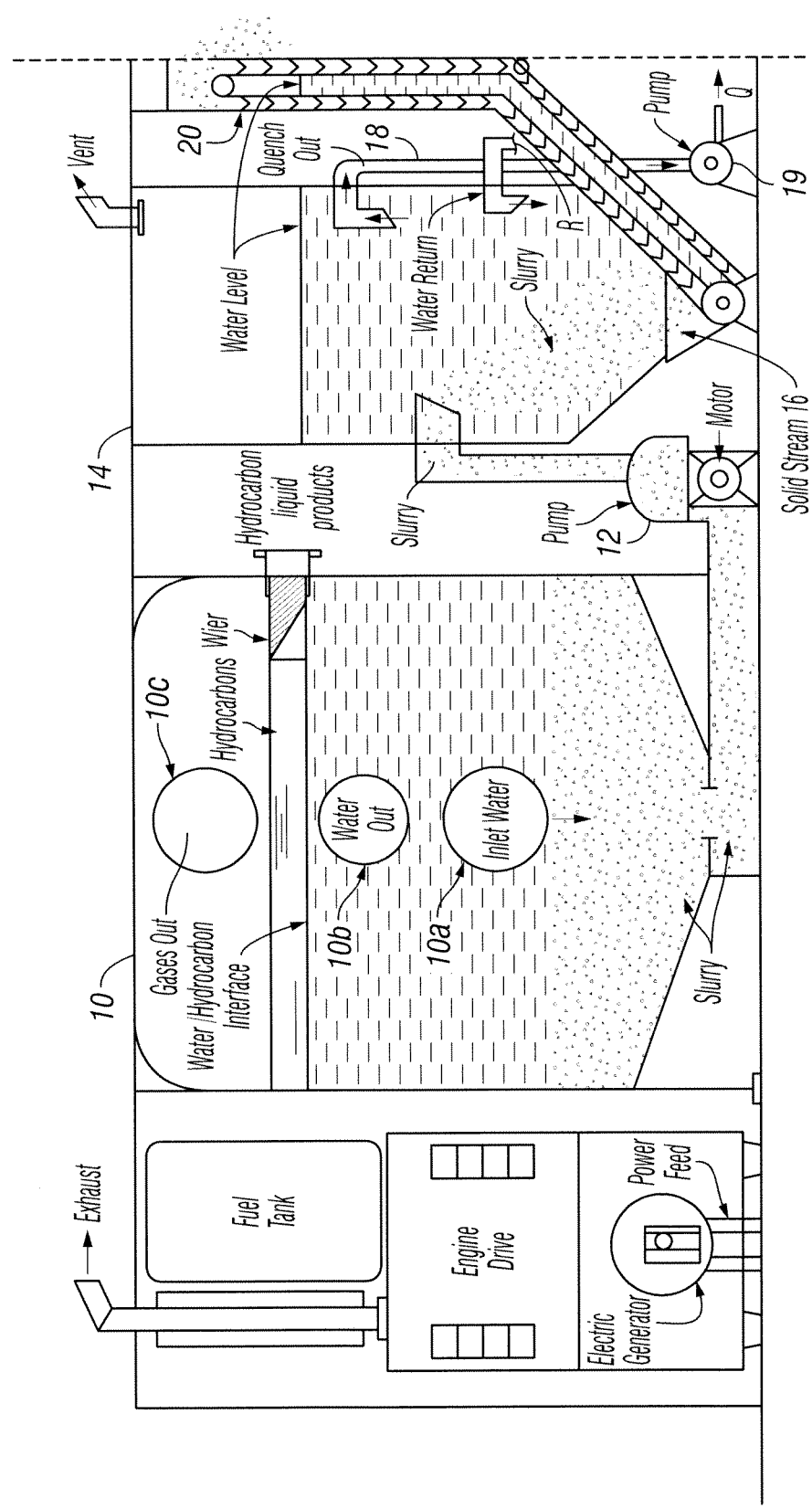
FIG. 2A1

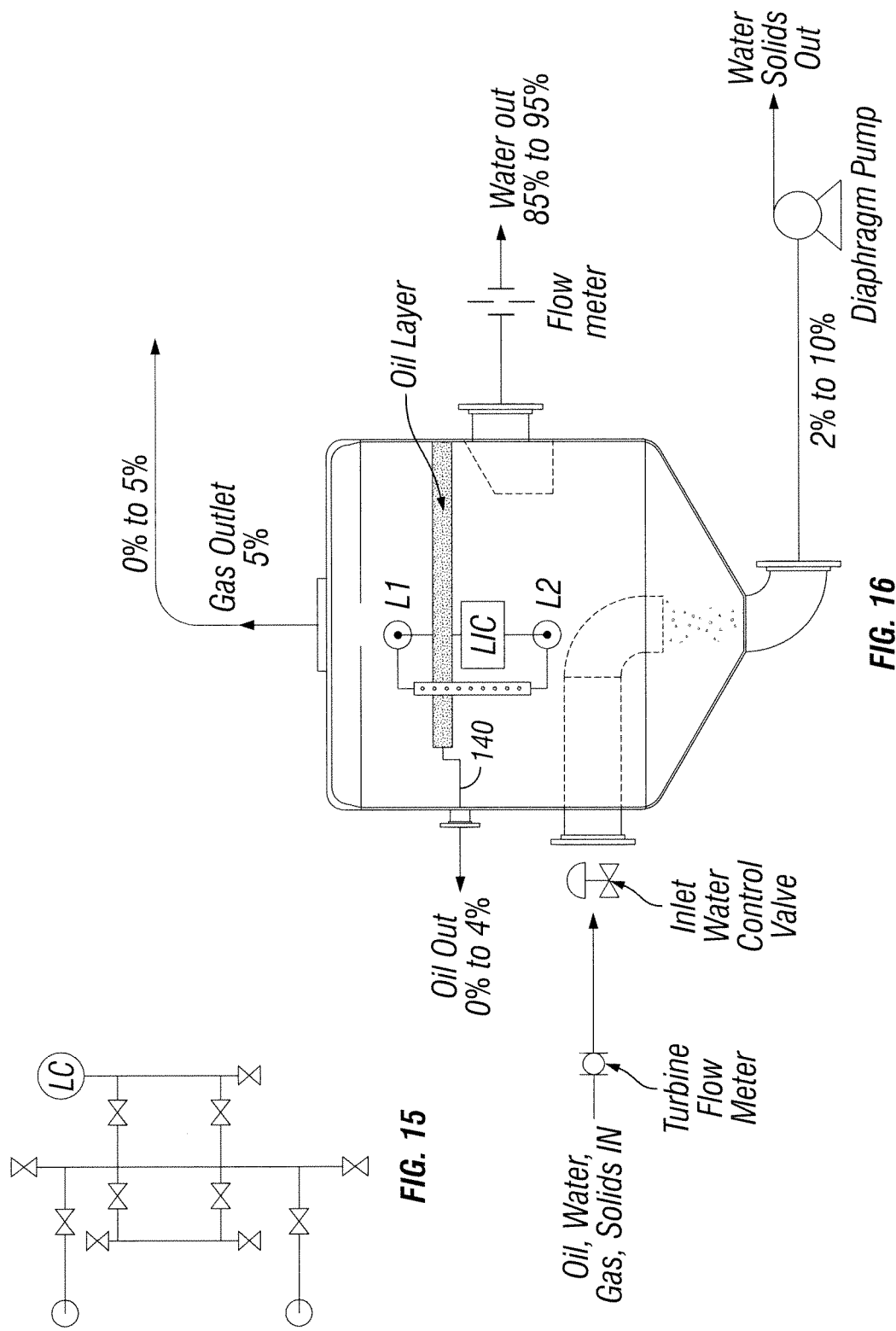

| Nominal Pipe Size | Coils $L_1$ & $L_3$ | | | Coils $L_2$-Inner & $L_2$-Outer | | | Tuning Capacitor $C_T$ | Nominal Power Supply Voltage (under load) |
|---|---|---|---|---|---|---|---|---|
| 3/4" | turns 375 | wire 20 ga. | length 1.9" | turns 250 | wire 20 ga. | length 1.9" | 0.039 μf | 11.0V(rms) |
| 1" | turns 375 | wire 18 ga. | length 2.3" | turns 250 | wire 18 ga. | length 2.3" | 0.010 μf | 13.0V(rms) |
| 2" | turns 375 | wire 17 ga. | length 3.7" | turns 250 | wire 17 ga. | length 3.7" | 0 | 19.0V(rms) |
| 4" | turns 375 | wire 16 ga. | length 3.55" | turns 250 | wire 16 ga. | length 3.55" | 0 | 33.0V(rms) |
| 6" | turns 375 | wire 12 ga. | length 5.18" | turns 250 | wire 12 ga. | length 5.18" | 0 | 37.0V(rms) |
| 8" | turns 146 | wire 8 ga. | length 8.5" | turns 146 | wire 8 ga. | length 8.5" | 0 | 37.0V(rms) |

FIG. 28

USE OF IONIZED FLUID IN HYDRAULIC FRACTURING

CROSS-REFERENCE TO RELATED APPLICATIONS

This application is a continuation of U.S. application Ser. No. 14/229,320, filed Mar. 28, 2014, which is a continuation in part of U.S. application Ser. No. 14/095,346, filed Dec. 3, 2013, which is a continuation of U.S. application Ser. No. 13/832,759, filed Mar. 15, 2013, which is a continuation in part of U.S. application Ser. No. 13/594,497 filed Aug. 24, 2012, which claims priority to U.S. Provisional App. No. 61/676,628, filed Jul. 27, 2012. This application claims priority to all the previously listed applications and also claims priority to U.S. Divisional application Ser. No. 13/753,310, filed on Jan. 29, 2013.

BACKGROUND OF THE INVENTION

The hydraulic fracturing of oil wells was started in the late Nineteen Forties as a means of oil well stimulation when trying to extend the economic life of a depleting oil well. Most oil wells, at that time, were driven vertically. The placement of shaped explosive charges, in thin wall casings, was limited to these explosive charges being placed in predetermined, hydrocarbon pay zones, and mostly in sand formations. The shaped explosive charges were ignited to create fissures or channels in these zones. A mixture of pressurized water and sand is pumped into the wellbore as a means of well stimulation.

This practice of well stimulation continues in vertically driven wells to this day. It wasn't until Mitchell Energy, in the mid-nineteen nineties utilized two newly developed technologies, changed the way unconventional, insitu hydrocarbon shale could be produced economically. The first new technology utilized was the development of steerable and controllable drilling techniques that could change the direction of a drill bit going in a vertical direction and rotating it into a horizontal direction. This rotation could be accomplished with a reasonably short bending radius and the drill bit could then continue to drill horizontally for a considerable distance into the shale formation.

The second technology that was needed involved the development of higher pressure fracturing pumps that were capable of achieving water pressures in the range of nine thousand to ten thousand pounds per square inch range at the surface. The answer was the development of fracturing pumps that could achieve these pressure levels with positive displacements. Both technologies are essential for the economic extraction of hydrocarbon gases and liquids in hard and soft shale formations. Companies today are producing gaseous and liquid hydrocarbons and use mostly chemical products to control the growth of micro-organisms. These could eventually migrate into potable water aquifers.

Currently, it is common practice to kill micro-organisms that are in the water mixture, either initially or insitu, by chemical or other types of biocides, so that the gaseous and liquid hydrocarbons that are trapped in the oil shale's matrix formation can flow freely into the channels and fissures vacated by the flow-back water mixture. Also, the channels created by the fracturing process must be kept open by the proppants that are initially carried into the fissures in the fracture zones by the injected water mixture. If the micro-organisms are not killed they will multiply, rapidly; and, if they remain in the fissures, they will grow and reduce or entirely block the flow of hydrocarbons from these fissures.

Another significant micro-organism type problem is the possible presence of a strain of microbes that have an affinity for seeking out and digesting any free sulfur or sulfur bearing compounds and producing hydrogen sulfides that must be removed from any product gas stream because it is a highly dangerous and carcinogenic material. All these types of micro-organisms must be destroyed if this type of problem is to be avoided.

In addition to the possibility of micro-organisms multiplying and blocking the flow of hydrocarbon product, the presence of dissolved solids in the water solution can also be a problem in the injected water mixture. They can deposit themselves as scale or encrustations in the same flow channels and fissures. These encrustations, if allowed to be deposited in these channels, will also reduce or block the flow of hydrocarbons to the surface. In order to avoid this condition, attempts are made in current industry practice to have the dissolved solids coalesce and attach themselves to the suspended or other colloidal particles present in the water mixture to be removed before injection in the well; however, those efforts are only partly effective. See, e.g. Denny, Dennis. (2012 March). Fracturing-Fluid Effects on Shale and Proppant Embedment. *JPT*. pp. 59-61. Kealser, Vic. (2012 April). Real-Time Field Monitoring to Optimize Microbe Control. *JPT*. pp. 30, 32-33. Lowry, Jeff, et al. (2011 December). Haynesville trial well applies environmentally focused shale technologies. *World Oil*. pp. 39-40, 42. Rassenfoss, Stephen. (2012 April). Companies Strive to Better Understand Shale Wells. *JPT*. pp. 44-48. Ditoro, Lori K. (2011). The Haynesville Shale. *Upstream Pumping Solutions*. pp. 31-33. Walser, Doug. (2011). Hydraulic Fracturing in the Haynesville Shale: What's Different? *Upstream Pumping Solutions*. pp. 34-36. Denney, Dennis. (2012 March). Stimulation Influence on Production in the Haynesville Shale: A Playwide Examination. *JPT*. pp. 62-66. Denney, Dennis. (2011 January). Technology Applications. *JPT* pp. 20, 22, 26. All of the above are incorporated herein by reference for all purposes.

In recent years, the oil industry has tried to develop a number of ways to address these concerns. The use of ultra violet light in conjunction with reduced amounts of chemical biocide has proven to be only partially effective in killing water borne micro-organisms. This is also true when also trying to use ultra-high frequency sound waves to kill micro-organisms. Both these systems, however, lack the intensity and strength to effectively kill all of the water-borne micro-organisms with only one weak short time residence exposure and with virtually no residual effectiveness. Both systems need some chemical biocides to effectively kill all the water borne micro-organisms that are in water. Also, some companies use low-frequency or low-strength electro-magnetic wave generators as biocide/coalescers; however, these too have proven to be only marginally effective.

Therefore, an object of further examples is to economically address and satisfactorily resolve some of the major environmental concerns that are of industry-wide importance. Objects of still further examples are to eliminate the need for brine disposal wells, eliminate the use of toxic chemicals as biocides for micro-organism destruction, or for scale prevention, and the recovery of all flow-back or produced water for reuse in subsequent hydraulic fracturing operations. Examples of the invention provide technically sound and economically viable solutions to many of the public safety issues that have concerned the industry in hydraulic fracturing.

SUMMARY OF EXAMPLES OF THE INVENTION

In at least one example, the specific pulse imparted has the following characteristics: variable, ultra-high frequencies in the range of between about 10 and 80 kHz. Other pulses having sufficient frequency to kill the micro-organisms present in water and to cause dissolved solids to coalesce will occur to those of skill in the art and may depend on the specific properties of the water at a particular well. The pulse will generally rupture the cells of the micro-organisms.

In a more specific example, method further comprises slowing the flow rate in the plurality of flows of water to be less than the flow rate of the flow of water with suspended solids. Slowing the flow rate allows for greater residence time during the step of generating positive charge. That increases the amount of positive charge in the water which is considered to be beneficial for killing microbes in the water and for providing residual positive charge for a period of time when the water has been injected into a geologic formation from which hydrocarbons are to be produced. The presence of positive charge in the waters' geologic formation is believed to have benefits in reducing the presence of various flow-reducing structures in the formation.

In a further specific example, the method generating positive charge in the flows of water comprises treating each of the plurality of flows of water with electromagnetic flux.

In still a further example, the majority of the suspended solids are less than about 100 microns. In some such examples, substantially all the suspended solids are less than about 100 microns. In a more limited out of examples, the majority of the suspended solids are less than about 10 microns. And in still a more limited set of examples, substantially all the suspended solids are less than about 10 microns. By reducing the size of the suspended solids, it becomes possible to pass the water through devices that are practical for generating positive charge in the water at a reasonable cost by using, for example, stainless steel conduits when the suspended solids approach 100 microns and softer materials (for example, PVC) as the solids approach 10 microns and smaller.

In a further example, the means for generating positive charge comprises means for treating each of the plurality of flows of water with electromagnetic flux. At least one such example, the means for treating each of the plurality of flows of water with electromagnetic flux comprises: a pipe; and at least one electrical coil having an axis substantially coaxial with the pipe. In some such examples, the pipe consists essentially of non-conducting material. In some such examples, the pipe consists essentially of stainless steel. In a variety of examples, there is also provided a ringing current switching circuit connected to the coil. In some such examples, the ringing current switching circuit operates in a full-wave mode at a frequency between about 10 kHz to about 80 kHz.

In still a further example, the means for co-mingling comprises a manifold having input ports for a plurality of flows of positively-charged water and an output port. In one such example, the means for co-mingling further comprises a well fracturing water and proppant blender. In a variety of examples, the majority of the suspended solids are less than about 100 microns. In some such examples substantially all the suspended solids are less than about 100 microns. In a more limited set of examples, the majority of the suspended solids are less than about 10 microns. In an even more limited set of examples, substantially all the suspended solids are less than about 10 microns.

Examples of the inventions are further illustrated in the attached drawings, which are illustrations and not intended as engineering or assembly drawings and are not to scale. Various components are represented symbolically; also, in various places, "windows" into components illustrate the flow of material from one location to another. However, those of skill in the art will understand which components are normally closed. Nothing in the drawings or detailed description should be interpreted as a limitation of any claim term to mean something other than its ordinary meaning to a person of skill in the various technologies brought together in this description.

In at least one example, a method for increasing hydrocarbon production from a subsurface formation, comprises: generating ionized fluid, pumping the ionized fluid from a surface location into at least one subsurface location in a hydrocarbon well, pressuring the ionized fluid at the at least one subsurface location, depressurizing the ionized fluid at the perforated location, wherein at least a portion of the ionized fluid returns to the surface location containing suspended materials. In another example, the method further comprises perforating at least one subsurface location.

In at least one such example, the method further comprises fracturing in at least one subsurface location. In yet another example, the method further comprises isolating at least one subsurface location from at least one portion of the hydrocarbon well.

In yet another example, the method, wherein said ionized fluid inhibits corrosion of the hydrocarbon well. In a further example, the method wherein the ionized fluid composition comprises at least fifty percent water by volume.

In another example, the ionized fluid comprises positively charged water. In still a further example, the method further comprises mixing the ionized fluid with a proppant.

According to a further example, the method wherein the ionized fluid is generated by exposing water to electromagnetic fields of influence. In yet another example, the method wherein the electromagnetic field of influence is pulsed at a full wave of up to three hundred and sixty times per second. In another example, the method wherein the electromagnetic field of influence is pulsed at a full wave of more than eighty times per second.

In yet another example, the method wherein the suspended particles include calcium based suspended particles.

In still a further example, the method further comprises recycling a portion of the flowback fluid from the well. In another example, the method further comprises recycling a portion of the produced fluid from the well. In yet another example, the method further comprises ionizing the recycled portion of the produced fluid. In another example, the method wherein the ionized fluid being generated comprises recycled fluid, produced fluid, and makeup fluid.

In a more specific example, a means system for increasing hydrocarbon production from a subsurface formation comprises: means for generating an ionized fluid; means for transporting the ionized fluid from the surface into at least one fracture zone of the subsurface formation, means for pressuring the ionized fluid at the at least one fracture zone; means for maintaining the pressurize at the at least one fracture zone; means for depressurizing the ionized fluid at the at least one fracture zone; wherein a portion of the ionized fluid returns to the surface carrying suspended particles of the formation. In yet another example, the means for generating ionized fluid further comprises a means for treating water with electromagnetic fields of influence. In another example, the system wherein the means for generating the electromagnetic fields of influence comprises: a pipe; and at least one electrical coil having an axis substantially coaxial with the pipe. In a further example, the system wherein the electromagnetic fields of influence are generated at a full wave frequency of more than eighty pulses per second.

In yet another example, the system wherein the ionized fluid is composed of at least fifty percent water by volume.

In another example, the system wherein the electromagnetic fields of intluence are generated at a full wave frequency of up to three hundred and sixty pulses per second. In a further example, the system wherein the electromagnetic fields of influence eliminate the majority of the microorganisms within the ionized fluid.

In another example, the system further comprises a means for adding proppant to the ionized fluid. In yet another example, the system wherein said means for adding proppant to the ionized fluid comprises a blender.

In another example, the system wherein said means for transporting the ionized fluid from the surface into a fracture zone of the subsurface formation comprises coiled tubing.

In yet another example, the wherein said means for pressuring the ionized fluid at the fracture zone comprises at least one fracturing pump.

In a further example, the system wherein said means for maintaining the pressure at the fracture zone comprises at least one packer.

In yet another example, the system wherein said means for depressurizing the ionized fluid at the fracture zone comprises coiled tubing. In another example, the system further comprises a drill mechanism attached to the coil tubing adapted to compromise the at least one packer.

In a further example, the system further comprises a means for recycling flowback fluid, wherein a portion of the recycled flowback fluid is used to generate the ionized fluid. In yet another example, the system further comprises a means for separating the flowback into water and at least one other substance.

In yet another example, the system wherein the ionized fluid comprises positively charged water. In another example, the system further comprises a means for recycling produced fluid, wherein a portion of the recycled produced fluid is used to generate the ionized fluid. In an example, the system further comprises a means for separating the produced fluid into water and at least one other substance.

In a more specific example, a method for increasing hydrocarbon production from a subsurface formation comprising: generating ionized fluid, re-entering a formation; accessing at least one select location within a hydrocarbon well; pumping the ionized fluid from a surface location into the subsurface formation at the at least one selected location in a hydrocarbon well, pressuring the ionized fluid in at least one selected location, depressurizing the ionized fluid in at least one selected location, wherein at least a portion of the ionized fluid returns to the surface location containing suspended materials. In a further example, the method further comprises eliminating the majority of the microorganisms within the ionized fluid. In yet another example, the method wherein the ionized fluid composition comprises at least fifty percent water by volume.

In yet another example, the method wherein the ionized fluid comprises positively charged water.

In a further example, the method wherein the ionized fluid is generated by subjecting a fluid to electromagnetic fields of influence. In yet another example, the method wherein the electromagnetic fields of influence are pulsed at a full wave of more than eighty times per second. In a further example, the method wherein the electromagnetic fields of influence are pulsed at a full wave of up to three hundred and sixty times per second.

In yet another example, the method wherein the suspended particles include calcium based suspended particles. In another example, the method further comprising isolating the at least one selected location from at least one portion of the hydrocarbon well.

In a further example, the method further comprises perforating in at least one selected location.

In yet another example, the method further comprises fracturing at least one selected location.

In another example, the method further comprises mixing the ionized fluid with a proppant. In yet another example, the method further comprising isolating the at least one selected location from a second selected location.

In a further example, the method further comprises installing at least one packer to isolate at least one selected location from at least one portion of the hydrocarbon well.

In an example, the method further comprises drilling out at least one packer.

In a more specific example, a method of increasing production from a subsurface shale formation comprises: generating ionized fluid with electromagnetic fields of influence; pumping the ionized fluid into the subsurface shale formation; and exposing the previously perforated zone to ionized fluid under pressure; wherein the production from the subsurface shale increases after the ionized fluid is depressurized, wherein the previously perforated zone has been previously fractured, further comprising fracturing the previously perforated zone and, further comprising selecting a zone to expose to ionized fluid.

In a further example, the method further comprises perforating the selected zone. In another example, the method further comprises fracturing the selected zone and isolating the selected zone. In yet another example, the method further comprises pressurizing the selected zone with ionized water. In yet another example, the method further comprises holding the pressure in the selected zone for a predetermined period of time. In yet another example, the method further comprises releasing the pressure in the selected zone. In yet another example, the method further comprises mixing the ionized fluid with a proppant.

In a more specific example, a device for use in a hydrocarbon well fracture operation comprising: an electromagnetic field generator having a first fluid input port and a first fluid output port; at least one fracturing pump having a second fluid input port connect to the first fluid output port of the electromagnetic field generator; and a coiled tubing device having the coil tubing input connect to the second fluid output port, and further comprises at least one well fracture tool attached to the coil tubing. In yet another example, the device further comprises at least one well perforation tool attached to the coiled tubing. In yet another example, the device further comprises at least one pipe in within the electromagnetic field generator located between the first fluid input port and the first fluid output port.

In yet another example, the device further comprises at least one electromagnetic coil surrounding at least one pipe. In another example, the device further comprises at least one completions tool attached to the end of coiled tubing.

In yet a further example, the device further comprises a wellhead at the surface of the hydrocarbon well, wherein the coiled tubing interfaces with the hydrocarbon well by way of the wellhead. In another example, the device further comprises a flowback line from the wellhead with an outlet port. In yet another example, the device further comprises the flowback line outlet port connected to a separator, the separator having an inlet port and at least one outlet port. In a even further example, the device further comprises at least one separator outlet port connecting to a second inlet port on the electromagnetic field generator.

At least one embodiment of the claimed invention may include a method for increasing hydrocarbon production from a subsurface formation, the method comprising, generating ionized fluid, pumping the ionized fluid from a surface location into at least one subsurface location in a hydrocarbon well, pressuring the ionized fluid at least one subsurface location, depressurizing the ionized fluid at the perforated location, wherein at least a portion of the ionized fluid returns to the surface location containing suspended materials. The embodiment may further include perforating and fracturing at least one subsurface location. Furthermore, the ionized fluid may comprise positively charged water. The ionized fluid may be generated by exposing water to electromagnetic fields of influence.

The embodiment of the invention may also include the electromagnetic field of influence being pulsed at a full wave of up to three hundred and sixty times per second. Furthermore, the suspended particles may include calcium based suspended particles. The embodiment further recycles a portion of the flowback fluid from the well. The embodiment may also ionize the recycled portion of the fluid recovered from the well. Finally, re-entering the formation is a option to further increase the production of the well.

Another embodiment of the claimed invention may include a system for increasing hydrocarbon production from a subsurface formation comprising a means for generating an ionized fluid, a means for transporting the ionized fluid from the surface into at least one fracture zone of the subsurface formation, a means for pressuring the ionized fluid at the at least one fracture zone, a means for maintaining the pressurize at the at least one fracture zone, a means for depressurizing the ionized fluid at the at least one fracture zone; wherein a portion of the ionized fluid returns to the surface carrying suspended particles of the formation. The ionized fluid may comprise at least fifty percent water by volume. The means for generating ionized fluid may include generating electromagnetic fields of influence at a full wave frequency of up to three hundred and sixty pulses per second. The electromagnetic fields of influence would eliminate the majority of the micro-organisms within the ionized fluid. The embodiment may include a means for adding proppant to the ionized fluid that may include a blender. It may include a drill mechanism attached to the coil tubing adapted to compromise at least one packer in the well. The embodiment may include a means for recycling flowback fluid, wherein a portion of the recycled flowback fluid is used to generate the ionized fluid. Another option could include a means for separating the flowback into water and at least one other substance. The embodiment may also comprise a means for separating the produced fluid into water and at least one other substance.

Another embodiment of the invention may include increasing production from a subsurface shale formation comprising generating ionized fluid with electromagnetic fields of influence, pumping the ionized fluid into the subsurface shale formation, exposing the previously perforated zone to ionized fluid under pressure; wherein the production from the subsurface shale increases after the ionized fluid is depressurized. The perforated zone may have been previously fractured. The previously perforated zone may be fractured again. A zone may be selected as suitable for exposing to ionized fluid. The invention may perforate the selected zone. After perforating the selected zone, an operator may frack the selected zone. Afterwards, the selected zone may be isolated. Then the selected zone may be pressured with ionized water. Then the pressure within the selected zone may be held for a predetermined period of time. The pressure in the selected zone may be released. Ionized fluid used in the selected zone may be mixed with proppant.

Another embodiment of the invention may include a device for use in a hydrocarbon well fracture operation comprising an electromagnetic field generator having a first fluid input port and a first fluid output port, at least one fracturing pump having a second fluid input port connect to the first fluid output port of the electromagnetic field generator, and a coiled tubing device having the coil tubing input connect to the second fluid output port. The device may include at least one well fracture tool attached to the coil tubing. The device may include at least one well perforation tool attached to the coiled tubing. The device may include at least one pipe within the electromagnetic field generator located between the first fluid input port and the first fluid output port.

DESCRIPTION OF THE DRAWINGS

FIG. 2A1 is an alternative to the embodiment of FIG. 2A.

FIG. 15 is a schematic of a control system useful in examples of the invention.

FIG. 16 is a representational view of a system useful in examples of the invention.

FIG. 28 is a chart specifying presently preferred values of certain parameters of the apparatus of FIGS. 19 to 24.

DETAILED DESCRIPTION OF EXAMPLES OF
THE INVENTION

Figure 1:
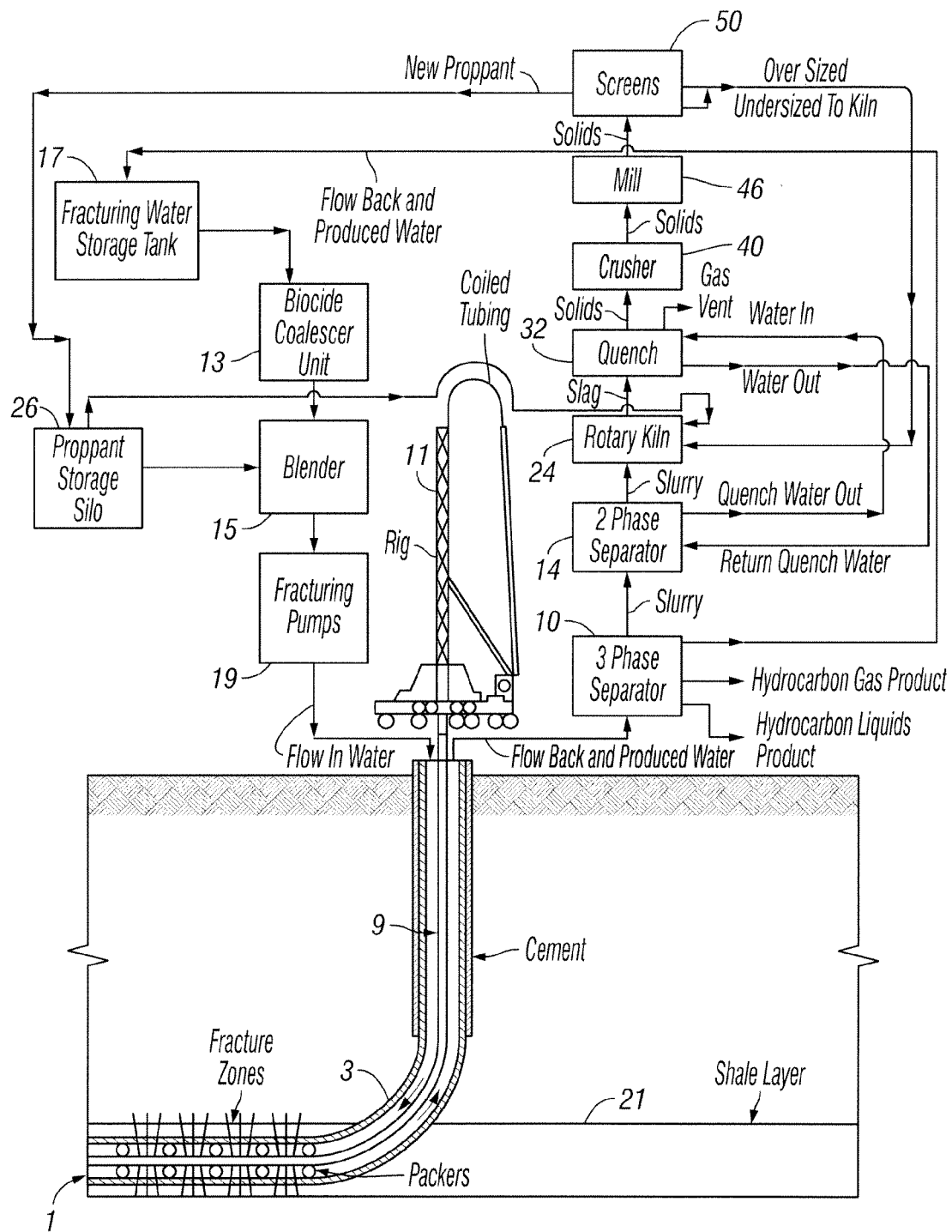
FIG. 1 is a diagram of a well site showing the flow of various materials used in various examples of the invention.

Referring now to FIG. 1, a flow diagram of the use of the invention in a hydrocarbon well having a well bore 1 with cemented casing 3 passing through fracture zones that are isolated by packers. Coil tubing 9 is inserted by rig 11 for fracture operations known to those of skill in the art.

Flow back (and/or produced) water is routed to three-phase solids/liquids/gas/hydrocarbon/water separator 10, from which any hydrocarbon liquids and gases are produced, and water from separator 10 is routed to a fracturing-water storage tank 17 which may also include water from another source (aka "make up" water). Wet solids are passed from three-phase separator 10 to two-phase separator 14, which produces water that is passed to a quench system 32 and slurry that are passed to kiln 24. Slag is passed from kiln 24 through quench system 32 to crusher 40 and then to mill 46. Milled material is separated into a specified size at screen 50 that is sent to a proppant storage silo 26, which may also include proppant from another source (e.g., a supplier of sand). Water is provided to biocide/coalescer unit 13. Proppant provided to blender 15 from silo 26, water is supplied to blender 15 from biocide/coalescer unit 13; the blended water and proppant are then provided to fracturing pumps 19, which pumps the blend into the well where it fractures the oil shale layer 21. Other additives may be provided to the blender 15, as desired. Also, proppant may be added to the water before the biocide/coalescer unit 13 in alternative examples.

Examples of the invention create a range of proppants of specific sizes from a slurry extracted from a hydraulically-fractured hydrocarbon well.

Figure 2A:
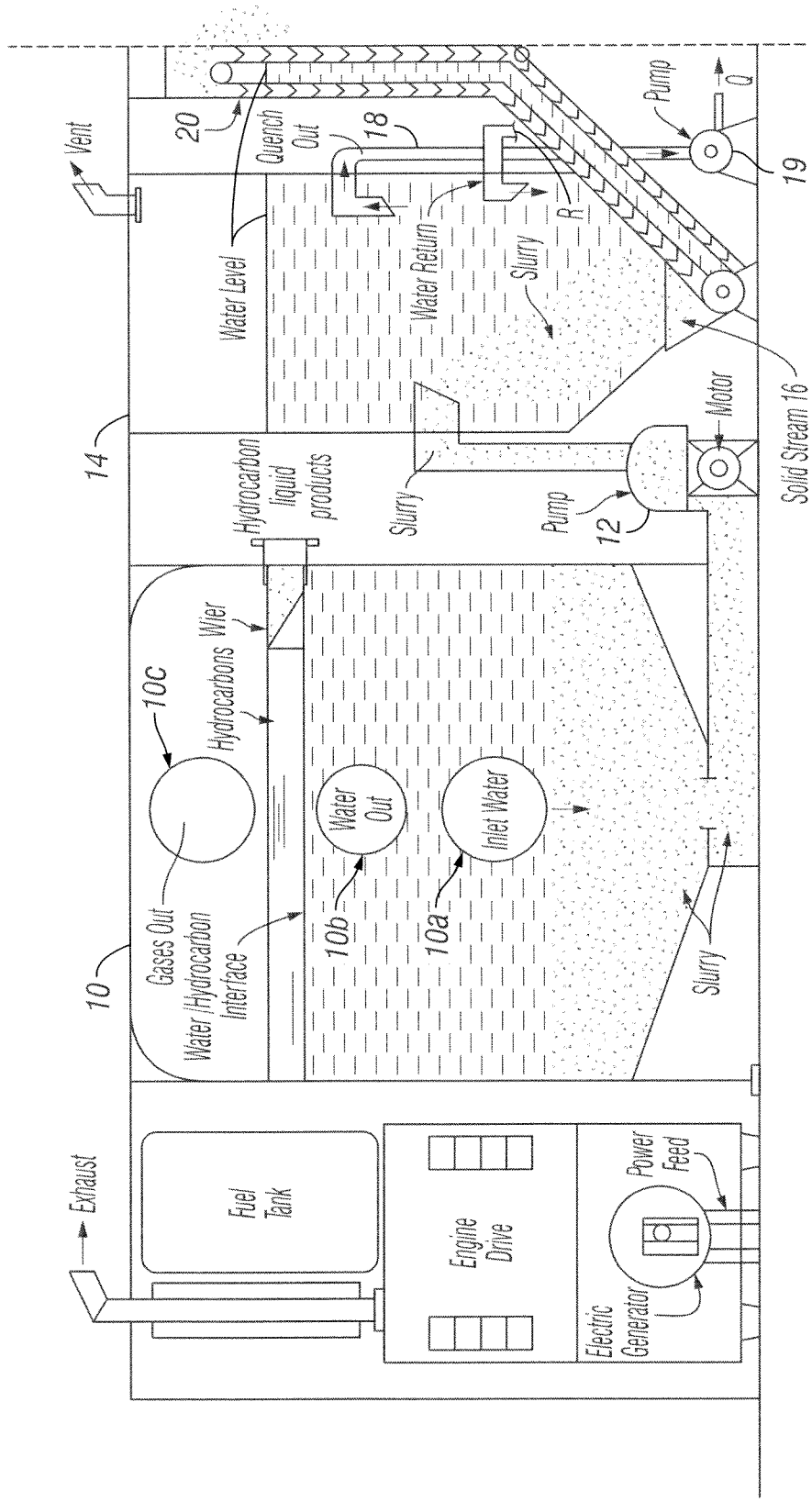
FIGS. 2A and 2B, when connected along their respective dotted lines, are a side view of an example of the invention.
Figure 2B:
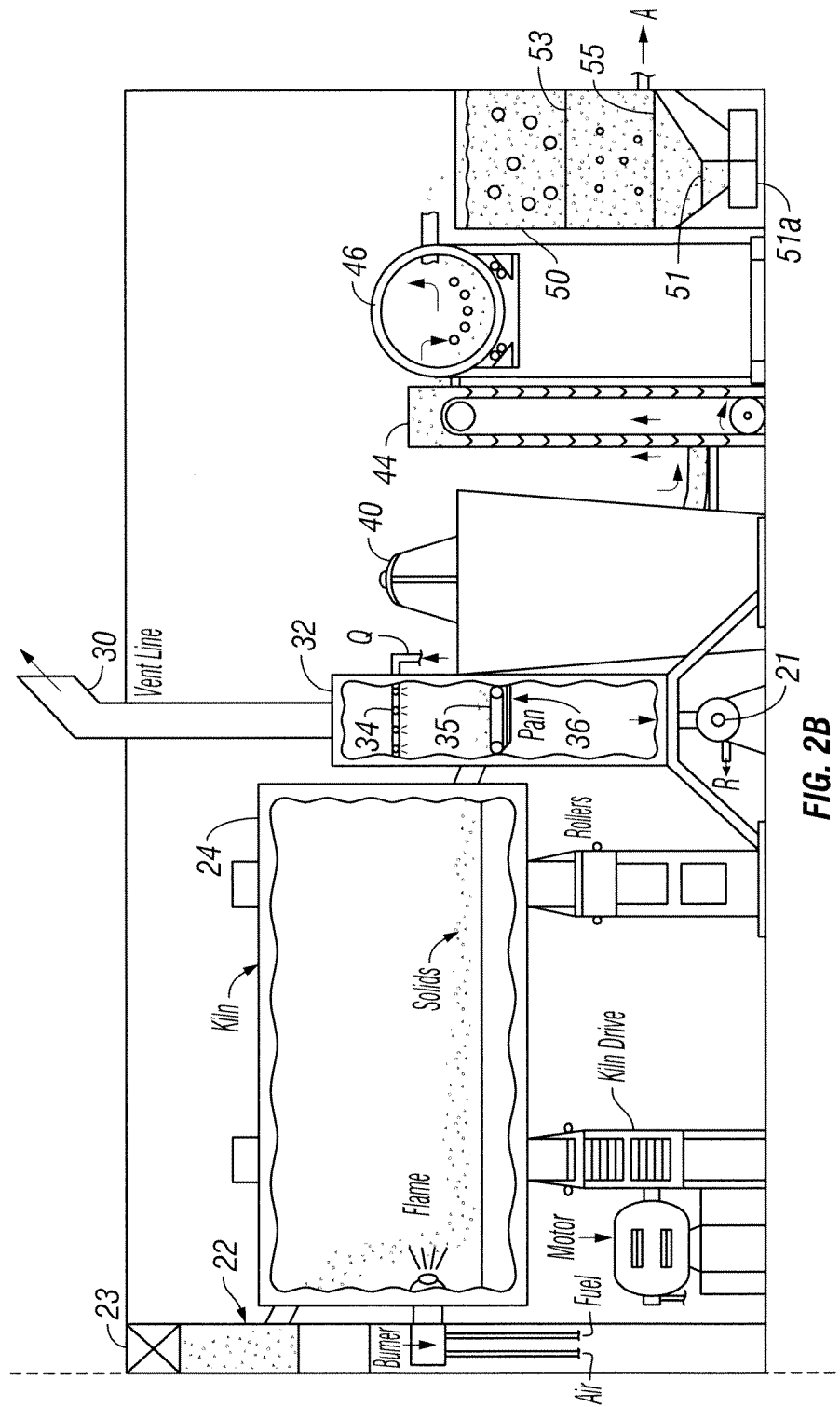
Figure 2C:
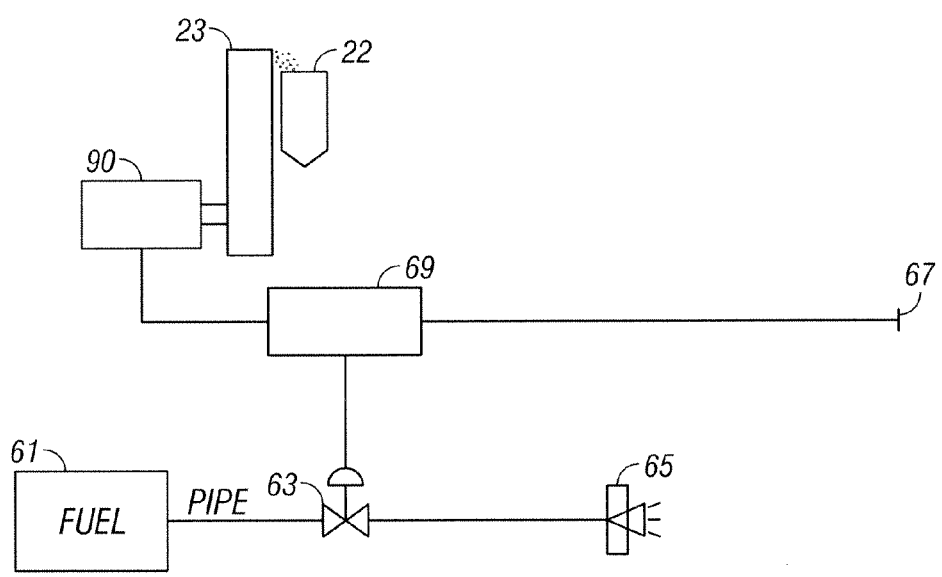
FIG. 2C is a schematic of a control system used in at least one example of the invention.

In FIGS. 2A and 2C and in FIGS. 3A-3D, a more specific example is seen. In that example, a slurry is extracted from gravity-precipitated slurry that accumulates at the bottom of a conventional three-phase separation tank 10 (which is of a common design known to those of skill in the art). In the specific example of FIG. 2A, as will occur to those of skill in the art, a water/liquid hydrocarbon interface level facilitates the separation and recovery of any liquid hydrocarbon product from the flow back or produced water stream (which is under pressure as it enters separator 10) by means of an internally or externally mounted water level indicator (not shown). That indicator sends a water level measurement signal to a pre-programmed, low level/high level water flow control data integrator (not shown). When the water level in the separator 10 reaches the high level set point, the data integrator actuates a control valve (not shown) that controls flow through the water feed pipe 10a (labeled "Inlet Water") to reduce the amount of water going into the three phase separator, and the rate of flow continues to decrease until a point is reached where the incoming amount of water equalizes and balances out the volume of water being withdrawn from the three phase separator. Conversely, if the water level in the three phase separator 10 falls below the low level set point, the data integrator actuates and further opens up the control valve in inlet pipe 10a in order to increase the amount or rate of water flow that is sufficient to stabilize the interface level. If this additional amount of water is not sufficient to stabilize the water level at the interface level, the integrator actuates a pump (not shown) and opens up another control valve (not shown) which is located in a discharge pipe (not shown) in water storage tank 17 (FIG. 1). That discharge pipe is connected to the inlet pipe 10a; thus water from fracturing water storage tank 17 continues to flow into the three phase separator together with the flow back or produced water until the water level in the separator 10 reaches the proper interface level. Then, the make-up water control valve closes and the make-up water pump is shut off. This control sequence is necessary in order to achieve steady state and continuous operational stability in the separation and recovery of any liquid hydrocarbon product that is carried into the three phase separator by the flow back or produced water feed stream.

A weir and baffle configuration (commonly known in gas/oil separation units) facilitates the separation and recovery of the liquid hydrocarbon product, if any, by using the interface level as the maximum height of the water in the separator and allowing the lighter liquid hydrocarbons to float on top of the water layer and then be withdrawn as liquid hydrocarbon product after it flows over the liquid hydrocarbon product weir and is withdrawn at the hydrocarbon liquid product outlet flange connection. A horizontal baffle under the weir limits the amount of potential water carry over that might be comingled with the liquid hydrocarbon product stream. As the flow back or produced water stream enters the three phase separator 10 the depressurization releases the lighter hydrocarbon gases and their release assists in the flotation of the liquid hydrocarbon products as well as the release of the gaseous hydrocarbon products through outlet 10c. Water flows out of separator 10 through pipe 10b to a surge tank (not shown) and is then pumped back to water tank 17 (FIG. 1).

From separator 10, a motor-driven positive displacement diaphragm-type sludge pump 12 moves the slurry upwards to the inlet opening of a two-phase water/solids separation tank 14 resulting in a solid stream 16 and a liquid stream 18 that is pumped by pump 19 to a quench (labeled "Q"). From the bottom of the two-phase water/solids separation tank 14, a bucket-elevator conveyor 20 transports the precipitated slurry materials from the lower part of the water/solids separation tank 14 upwards from the water level and discharges them into the feed-hopper 22 (FIG. 2B). The discharge is seen in FIG. 2A as going over a dashed line, which connects with the dashed line to the left of FIG. 2B where slurry is seen accumulating in feed-hopper 22 of a slagging, rotary-kiln 24, leaving the slurry water to remain in the water/solids separation tank 14 and the elevator 20. As a result, all separation is carried out at atmospheric pressure rather than in pressurized-vessels (as is current practice).

In the feed-hopper 22, the slurry materials from the water/slurry separation tank are mixed with specification proppant from silo 26 (FIG. 1), as well as under-sized and over-sized solid materials that come from a final screening unit 50 (described below).

As the fusion process for the proppant material proceeds, inorganic proppant materials are fused into a uniform mass and volatile organic materials that may have been present in the feed stream from the water/solids separation tank 14 are burned and vaporized prior to the gases being eventually discharged into an exhaust vent 30.

The proppant material exiting from the rotary kiln 24 is quenched with a stream of water to reduce the temperature of the material, as it emerges from the outlet of the kiln 24. In some examples, discharged material flows onto a perforated, motor-driven stainless-steel conveyor belt 35 and the water cascades, through spray nozzles 34 on to the moving belt 35 thereby solidifying and cooling the proppant material. The water used for quenching the proppant material comes from the water/solids separation tank 14 (see FIG. 2A) using, e.g., a motor-driven centrifugal pump 19 to push the water to the quench nozzles 34 of FIG. 3B. An excess water collection pan 36 is positioned under the conveyor belt 35 to collect and recover any excess quench water and convey it back to the water/solids separation tank 14 by a motor-driven centrifugal pump 21 and a pipeline shown flowing to return "R" of FIG. 2A.

Quenching the hot proppant material, as it is discharged from the kiln 24, causes a multitude of random, differential-temperature fractures or cracks due to the uneven contraction of the proppant material and the high internal stresses caused by rapid quenching. The different sized pieces of proppant material are discharged directly into the material crusher 40.

Crushing or breaking up the large irregular pieces of proppant material and reducing their size is accomplished, in some examples, by a motor-driven, vertical-shaft, gyratory, eccentric cone or jaw crusher, known to those of skill in the art. The degree of the size reduction is adjusted by changing the spacing or crusher gap, thus allowing a range of different material sizes to be produced, as is known to those of skill in the art.

Sizing of the proppant material is accomplished by the grinding or milling of the crushed proppant material after the proppant material is discharged at the bottom of the crusher. In the illustrated example, the material is conveyed upwards to ball mill 46 by a bucket-elevator conveyor 44. In at least one alternative example, a rod mill is used. The mill 46 is adjusted to grind the proppant material to different specific size ranges by changing rotation, the size and spacing of the rods or balls in the mill 46 (or its rotation).

Figure 3A:
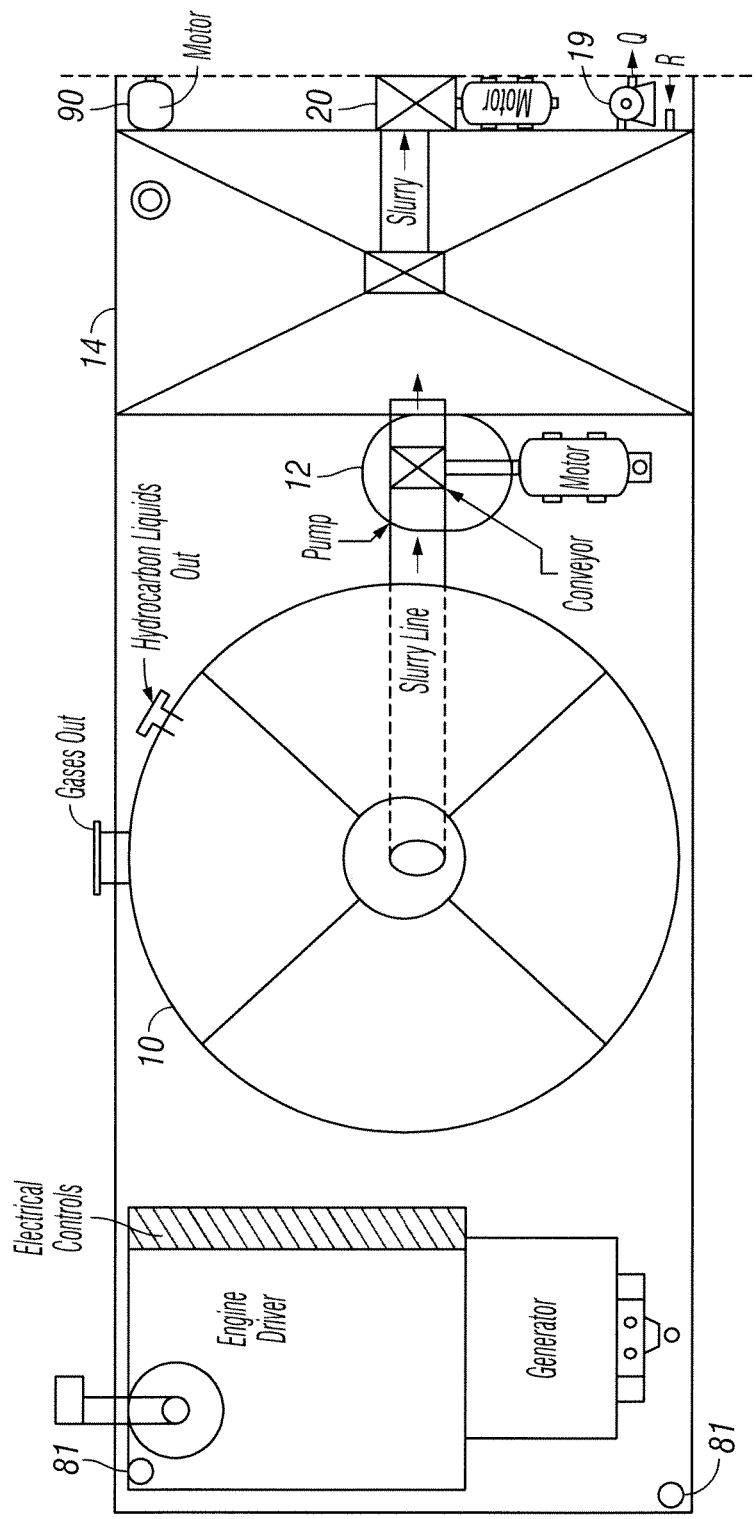
FIGS. 3A and 3B, when connected by the overlapping components next to their dotted lines, are a plan view of the example of FIGS. 2A and 2B.
Figure 3B:
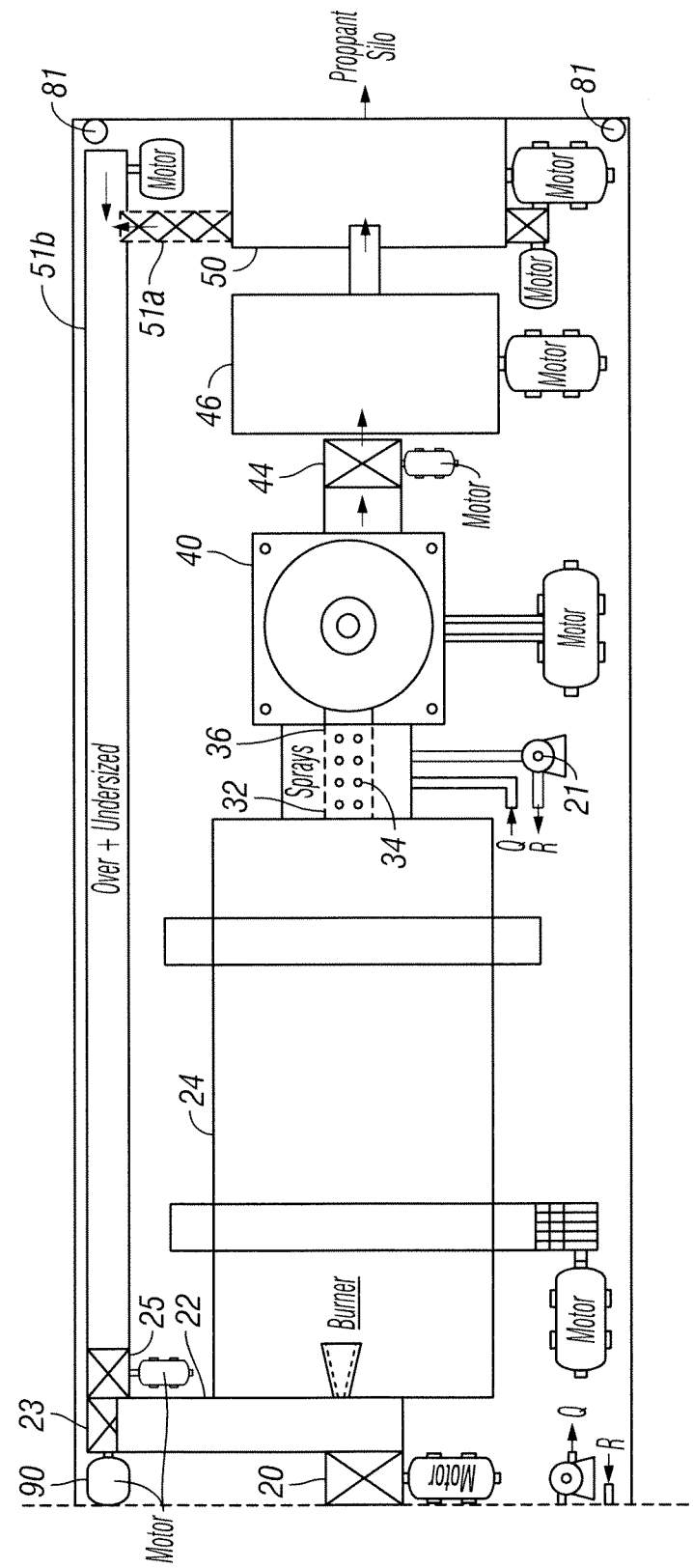

The milled proppant material flows by gravity down through the grinding zone of the mill and is discharged onto vibrating screen 50 where the mesh openings are selectively sized to a specific sieve value. For example, for soft mineral shale the mesh openings are in the 590 micron range or a #30 sieve. For hard mineral shale (for example) the mesh openings would be in the 150 micron range or a #100 sieve. Proppant material of the proper size flows downward by gravity through a selectively sized screen exiting at "A." Proppant material that is too large to pass through the slanted, vibrating screen 53 exits onto belt 51a (seen better in FIG. 3B), and the rest drops to screen 55. Proppant material between the sizes of screens 53 and 55 exit as correctly sized proppant at "A" and is transported to silo 26 (FIG. 1). Under-sized proppant drops onto belt 51a which conveys the under-sized and over-sized proppant to belt 51b, which then carries the proppant back to kiln 24, through elevator 25. FIGS. 3A and 3B illustrate a top view of an example of the invention in which the components are mounted on a trailer or skid mounted that are assembled at a well site with biocide and other components (e.g., FIGS. 4 and 5). Such trailers or skids are leveled in some examples by leveling jacks 81.

Figures 3C, 3D:
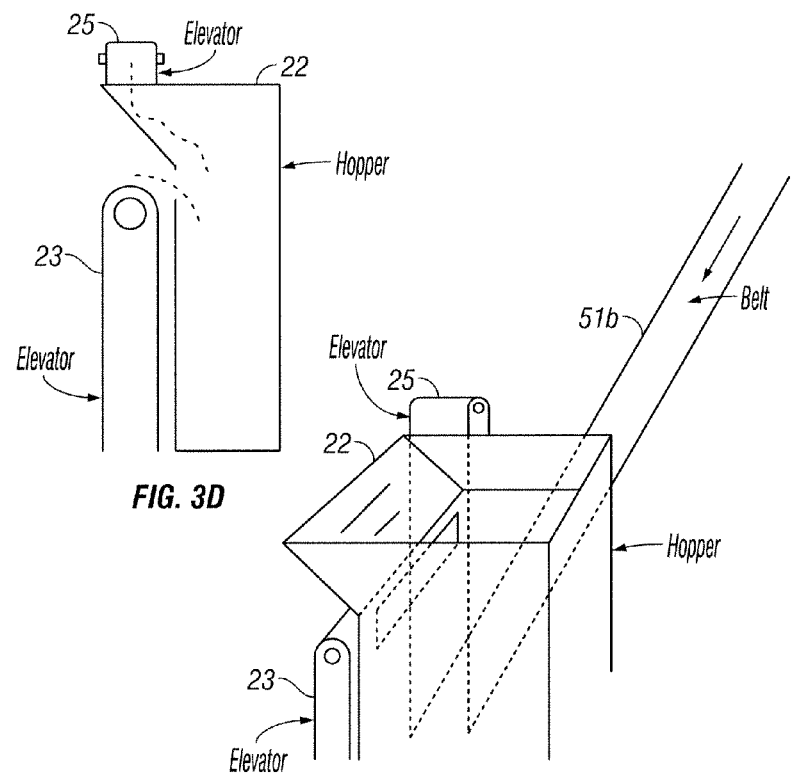
FIGS. 3C and 3D are an isometric and side view, respectively, of an aspect of the examples of FIGS. 2A-2B and FIGS. 3A-3B.

As seen in FIGS. 3C and 3D, elevator 25 deposits material into the top of feed hopper 22 and elevator 23 deposits material from the silo into feed hopper 22 from a lower level through an opening in feed hopper 22.

The properly-sized proppant materials flow is fed, by gravity, into a specification proppant container (not shown) for transfer to the specification proppant storage silo 26 (FIG. 1) which may also contain specification proppant from another source.

Referring now to FIG. 2B, it is desirable to control the viscosity of the proppant feed mixture, to attain stability of sustaining an optimum fusion temperature (in some examples, approximately 2200 degrees Fahrenheit). As the proppant feed mixture temperature is rising, due to the heat in kiln 24, the process of fusing the various inorganic materials into a uniformly viscous mass is achieved when the temperature in the proppant mixture reaches the fusion temperature of silicon dioxide or sand. The viscosity of the proppant material is a function of the temperature of the material itself. Such control is accomplished in various ways.

In at least one example, the temperature of the fused material is measured, by any means know to those of skill in the art, for example, an optical pyrometric sensor in quench system 32, as it exits from the kiln. If the temperature is above the fusion point of the material, it will be too liquid, and the fuel to the kiln is reduced. At the same time, more specification proppant may be added to the feed hopper 22. This affects the temperature because the material coming from the slurry is not uniform and is not dry; adding proppant from the silo evens out the variability.

Referring now to FIG. 2C, a schematic is seen in which sensor 67 signals integrator 69 with the temperature of the output of the kiln 24. Integrator 69 then controls variable-speed motor 90 (FIG. 3A) that operates elevator 23 (see also FIG. 3B) that carries proppant from the bottom of proppant silo 26 and discharges it into the slagging rotary kiln feed-hopper 22. The different material streams are comingled in the feed-hopper 22 before they enter the revolving drum of the kiln 24. The proportion or amount of specification proppant that is needed to be added to the material stream from the water/solids tank 14 is adjusted, depending upon the changes in the composition of the materials coming from the water/solids separation tank 14. This increases uniformity of the proppant material feed mixture that kiln 24 uses in the fusion process. In at least one example, if the temperature is too high, the fuel to the burner is reduced; if that does not correct it, the amount of proppant to the kiln will be increased. Likewise, if the temperature is too low, the fuel is increased to the burner; and, if that does not work, the amount of proppant is decreased. Alternative arrangements will occur to those of skill in the art.

Referring back to FIG. 2C, integrator 69 also controls valve 63 to increase or decrease the supply of fuel 61 for kiln burner 65.

Referring again to FIG. 1, one example of the invention is seen in which separator 10 is seen feeding the slurry to separator 14, and water from separator 10 is the joined with new "make-up" (in tank 17) water to be used in injection in a new fracturing job. The combined flows are treated by an electromagnetic biocide/coalescer 13 of the type described in U.S. Pat. No. 6,063,267, incorporated herein by reference for all purposes (commercially available as a Dolphin model 2000), which is set, in at least one example, to impart an electro-magnetic pulse having the following characteristics: selectable, variable, and tuneable frequencies in a range between about 10-80 kHz. Such a pulse is sufficient to kill biological organisms and to cause a positive charge to be applied to the water, making the dissolved solids capable of being precipitated or coalesced in the well.

Figure 4:
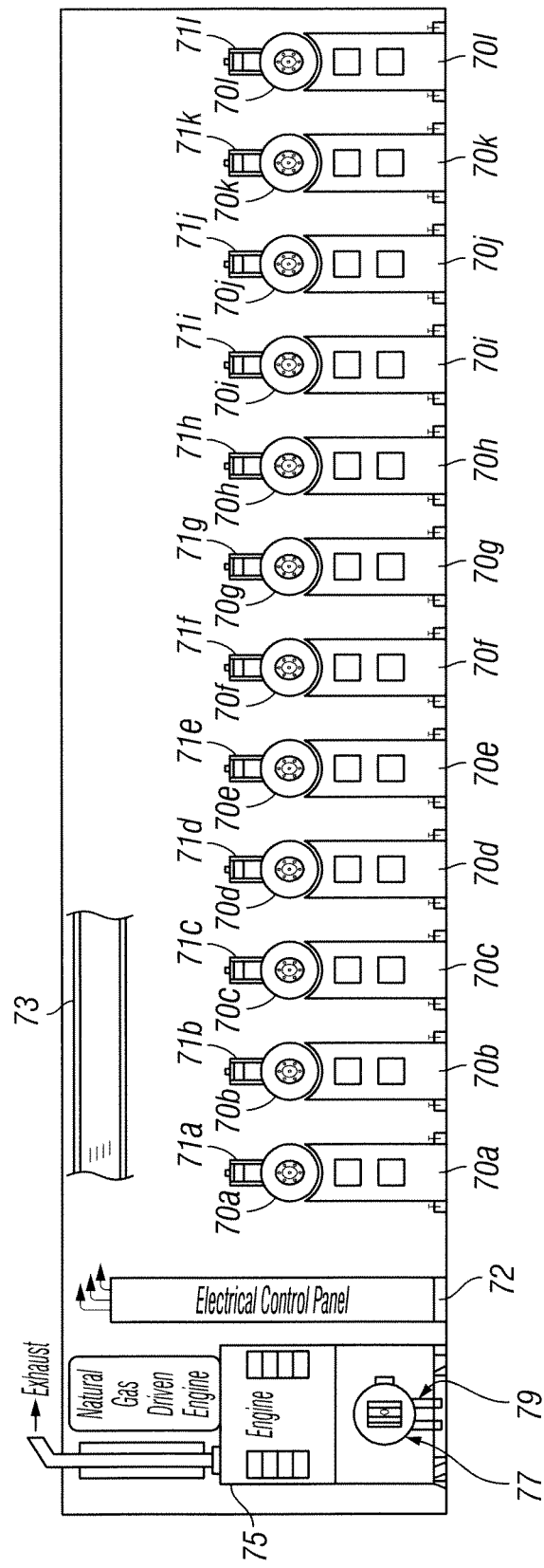
FIG. 4 is a side view of a further example of the invention.
Figure 5:
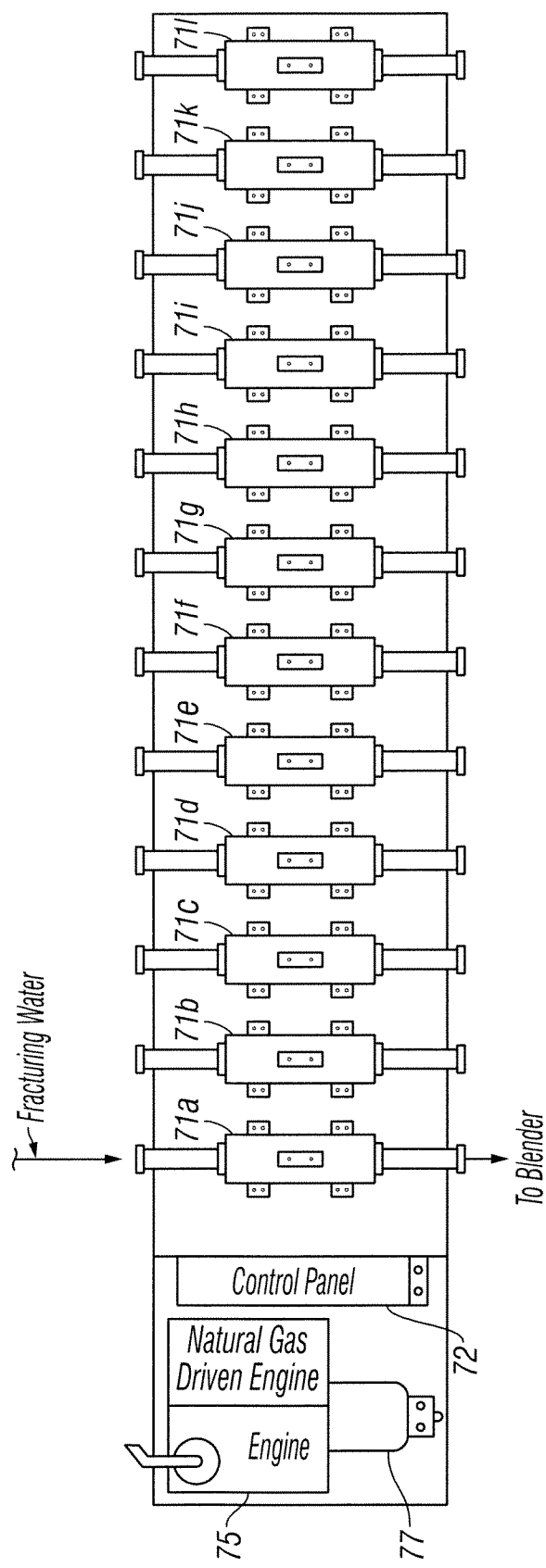
FIG. 5 is a plan view of the example of FIG. 4.

FIGS. 4 and 5 are side and top views, respectively, of an example trailer-mounted or skid-mounted system that includes a set of biocide/coalescers 70a-70l, organized to receive fracturing tank water in the type of flow rate used in common shale-fracture operations. Such units are run from an electrical control panel 72, that is connected to an overhead power and control distribution rack 73 that connects to overhead power feed components 71a-71l. Power is supplied by an engine 75 that turns an electrical generator 77 that is connected to power feed 79 for supplying power in a manner known to those of skill in the art.

Referring now to FIG. 2A1, an alternative to the embodiment of FIG. 2A as seen in which the water level of two-phase separator 14 is at the same as the level and three-phase separator 10. In such an embodiment, there is fluid communication through a diaphragm pump 12 and tanks are at atmospheric pressure such that the liquid gas interface is at the same level.

Figure 6:
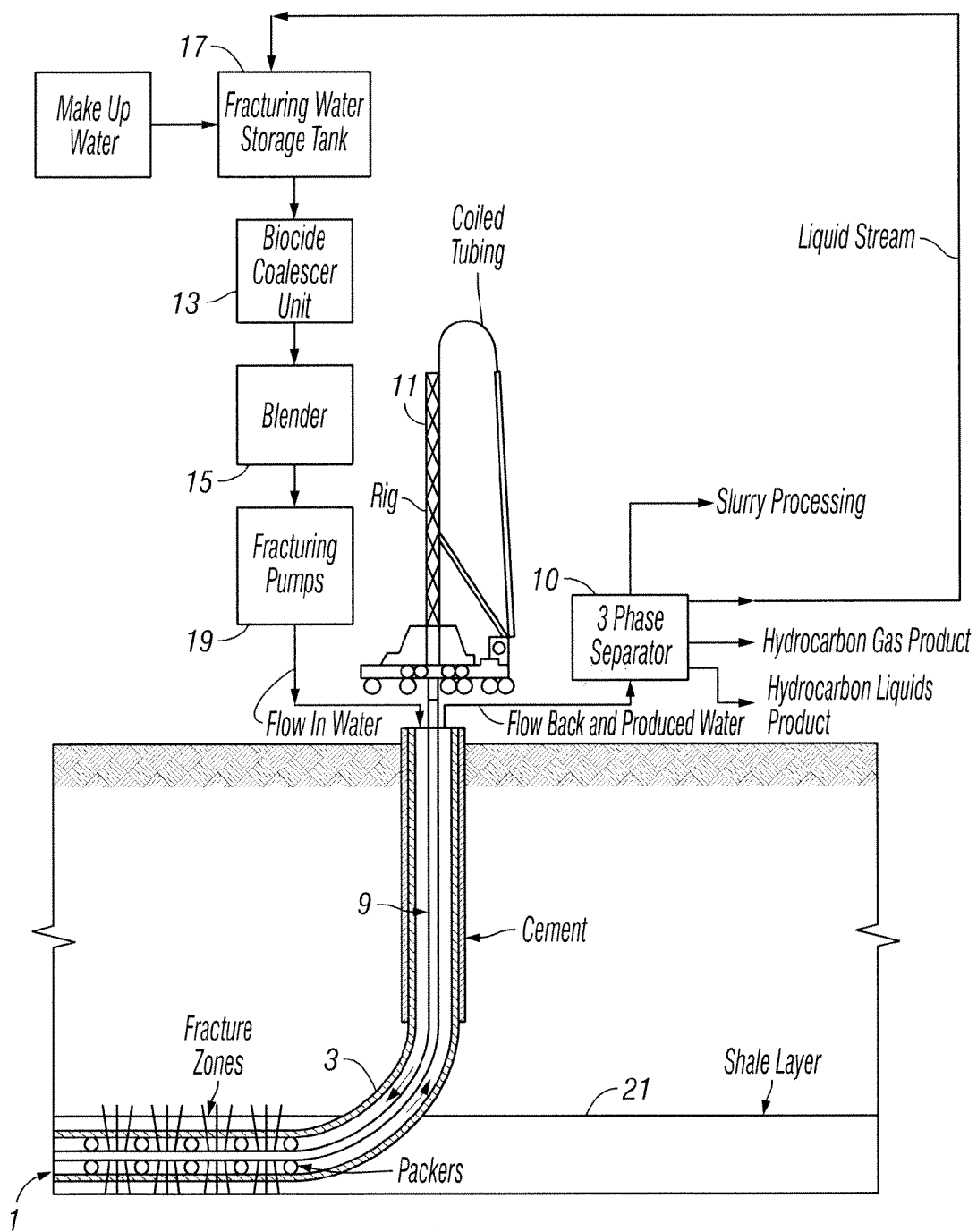
FIG. 6 is a diagram of a well site showing the flow of various materials used in various examples of the invention.

Referring now to FIG. 6, according to another example of the invention, a system is provided for treating hydrocarbon well fracture water from a hydrocarbon well, system comprising a means for separating solids from fracture water comprising a three-phase, four material separator 10, wherein a flow of water with suspended solids results that is passed to a fracturing water storage tank 17. From there so-called "make-up water" may be added to fracture water storage tank 17 and the flow of water is passed through a means for separating the flow of water into a plurality of flows of water (described in more detail below); to a means for generating positive charge in the plurality of flows of water (for example, a set of biocide coalescers or units as described above), wherein a plurality of flows of positively-charged water results. A means for comingling plurality of flows of positively-charged water more evenly distributes the positive charge in the water before it is passed to blender 15 for use in subsequent well fracturing operations.

Figure 7:
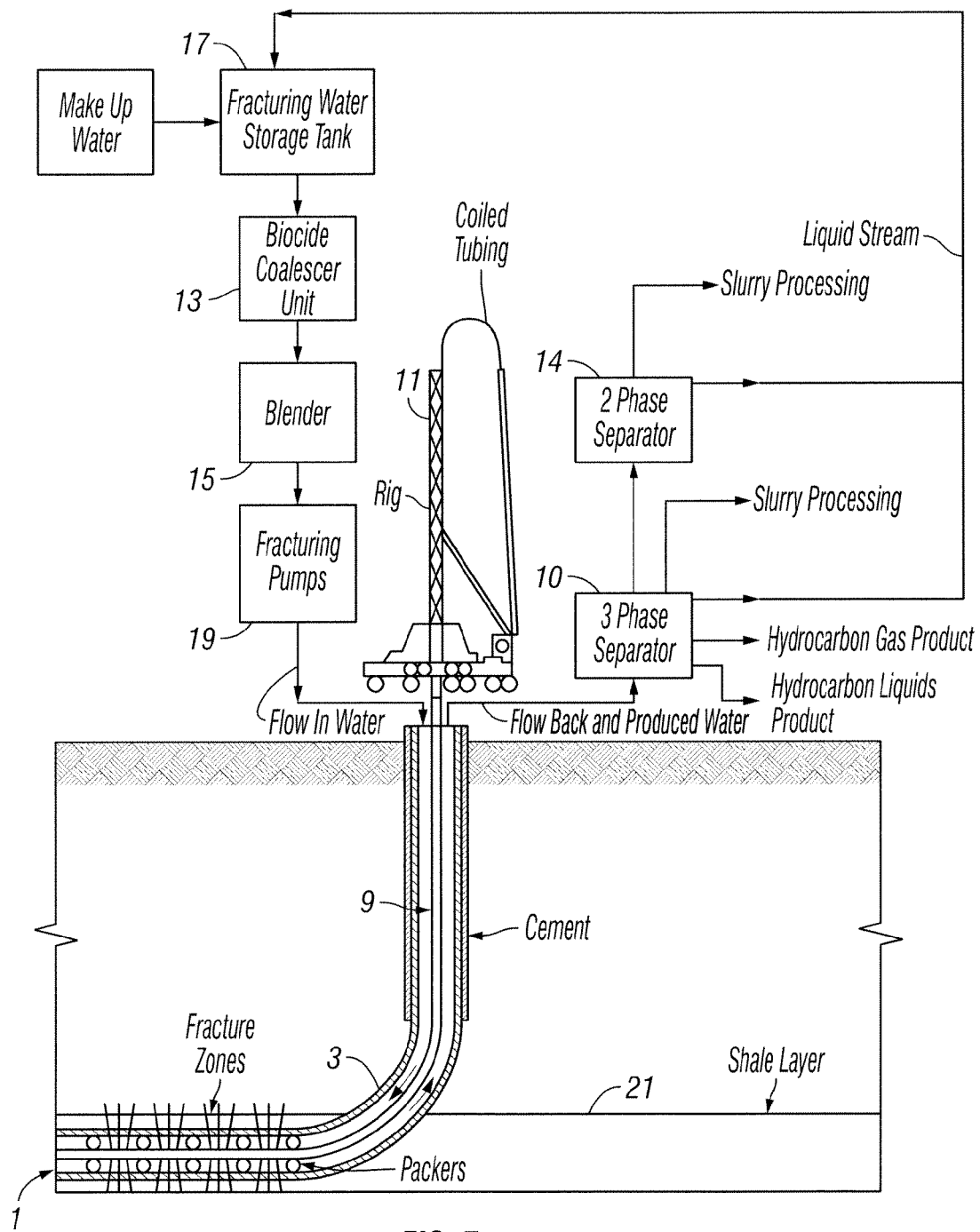
FIG. 7 is a diagram of a well site showing the flow of various materials used in various examples of the invention.

FIG. 7 illustrates an example in which the means for separating further comprises a second stage, two-phase separator 14, the two-phase separator comprising an input for receiving water flow from the three-phase gas oil separator. The water flow from the three-phase separator is taken from the midsection of the separator, while most solids dropped out at the bottom, as described above. However, the water from the three-phase separator includes suspended solids that can damage a biocide coalesce or unit. Accordingly, in one example embodiment, the water flow from the three-phase separator 10 is passed to the input of a two-phase separator 14, which also includes an output for the flow of water with suspended smaller suspended solids. Two-phase separator 14 also drops solids out of its lower section in the form of a slurry. The slurry from three-phase separator 10 and two-phase separator 14 are further processed (for example as described above) or disposed of in some other manner.

Figure 8:
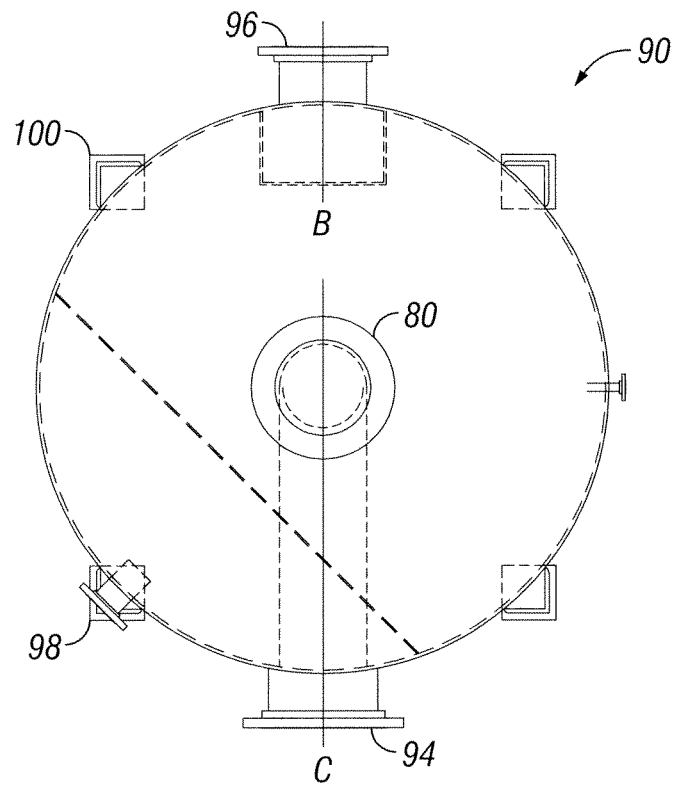
FIG. 8 is a top view of an example of the invention.
Figure 9:
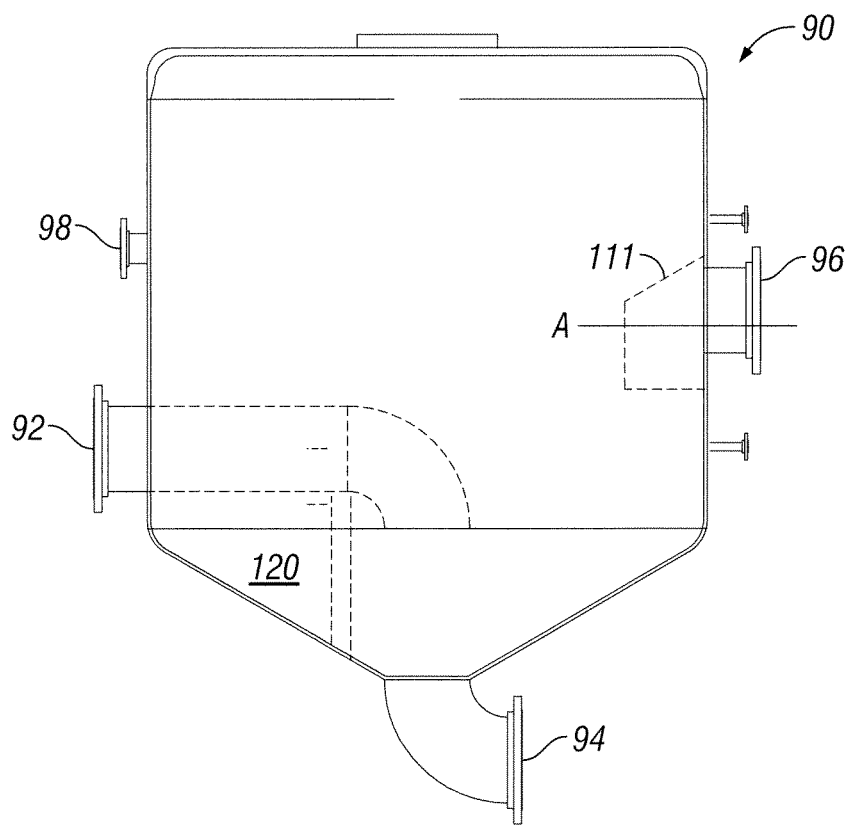
FIG. 9 is a side view of an example of the invention.
Figure 10A:
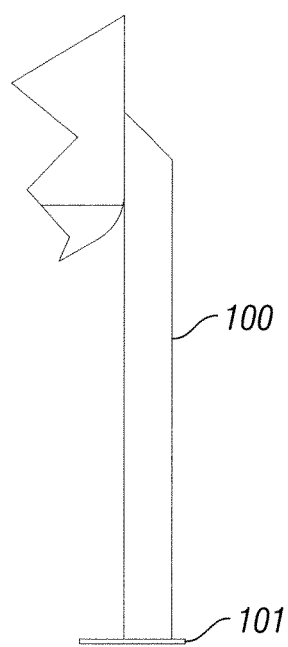
FIG. 10A is a side view of support leg 100 of FIG. 8.
Figure 10B:
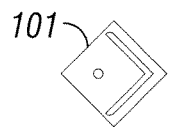
FIG. 10B depicts a top view of foot 101 of FIG. 10A.

Referring now to FIGS. 8 and 9, an example of a three-phase, four-material separator 90, according to some embodiments of the invention and place of three-phase separator 10, as seen. Separator 90 and includes an input 92, a slurry output 94, a liquid hydrocarbon output 98 and a gas output 80. As also seen in FIG. 10A, separator 90 is supported by legs 100 (which includes a foot 101, as seen in FIG. 10B) welded to the side of separator 90.

Figure 11:
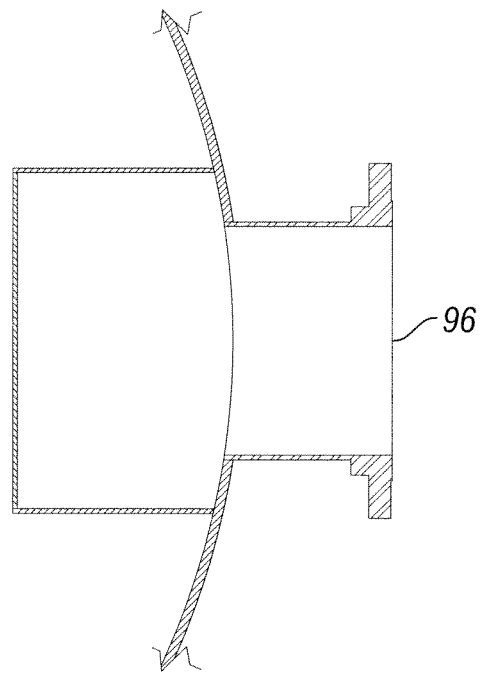
FIG. 11 is a cross section view taken through line A of FIG. 9.
Figure 12:
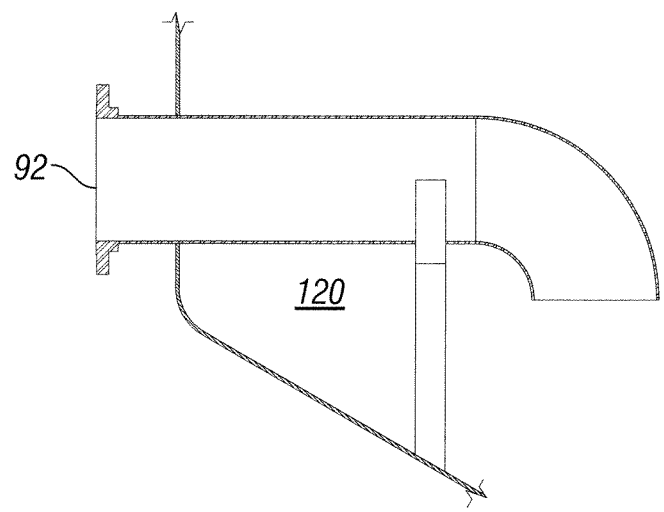
FIG. 12 is a cross section view taken along line C of FIG. 8.
Figure 13:
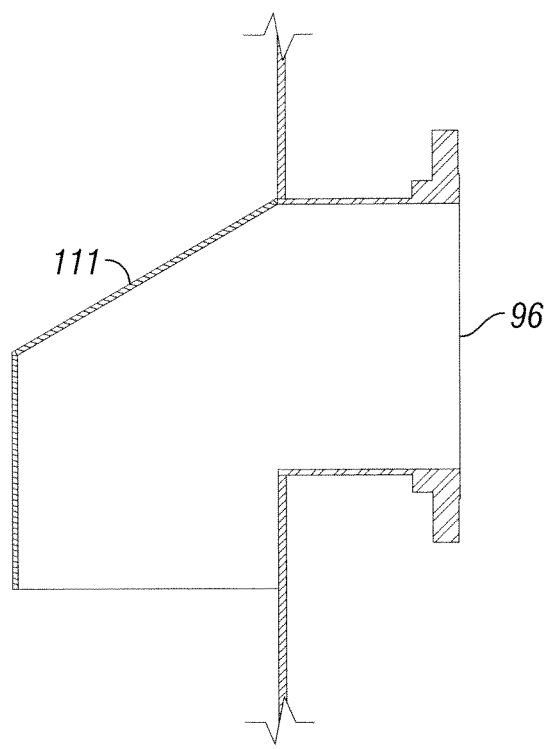
FIG. 13 is a cross section view taken along line B of FIG. 8.

Referring again to FIG. 9, as well as FIG. 11 (which is across section taken through line A of FIG. 9) and FIG. 13 (which is a cross-sectional taken along line B of FIG. 8), a baffle 111 allows water having some suspended solids to exit separator 90 while larger solids exit as the slurry at the bottom exit 94. FIG. 12 illustrates a cross-section of input 92 (taken along line C of FIG. 8) where input pipe 92 is supported by support 120 connected to the bottom of separator 90 and holding input pipe 92 and a saddle.

In a further example, there is also provided: means for monitoring an oil/water interface level; and means for controlling the oil/water interface level in the first and second separator. In one such example, the means for monitoring comprises an oil/water interface level indicator and control valve sensor (for example, a cascade control system).

Figure 18:
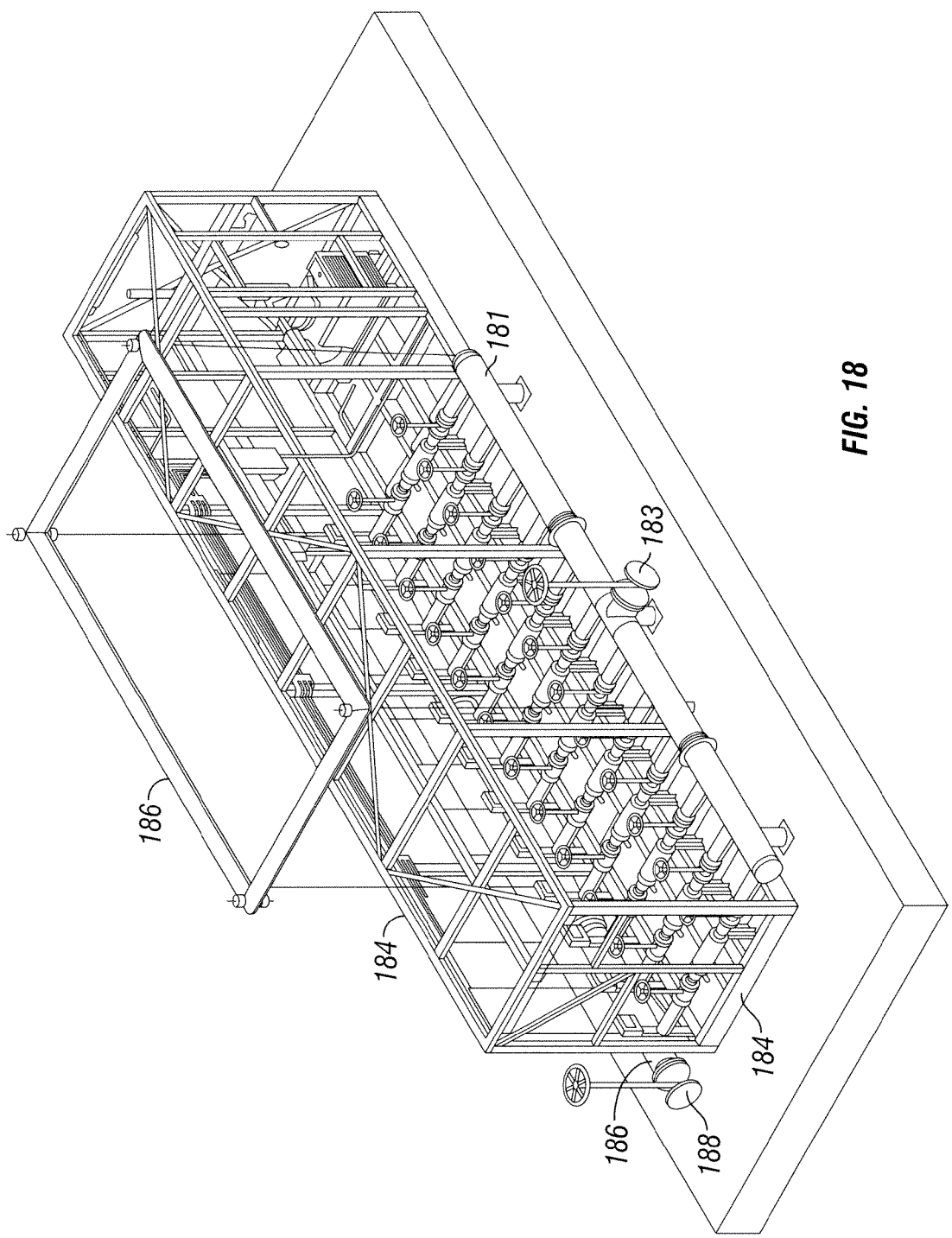
FIG. 18 is a perspective view of examples of the invention.

As illustrated in FIG. 18, in some examples, the means for separating the flow of water into a plurality of flows of water comprises a manifold 181 having an input port valve 183 to receive the flow of water with suspended solids from a means for separating and a plurality of output ports attached to biocide coalescer units 184, each output port having a cross-sectional area that is smaller than the cross-sectional area of the input of the manifold. In some examples, the sum of the cross-sectional areas of the output ports is greater than the cross-sectional area of the input ports, whereby the flow rate exiting the manifold is less than the flow rate entering the manifold. In at least one example, the manifold 181 comprises a 1:12 manifold (for example, having cross-sectional diameters of 4 inches in the output ports and a larger cross sectional diameter in the input ports). In an alternative example, the means for separating the flow of water into a plurality of flows of water comprises a water truck as is known in the art (not shown) having a plurality of compartments, each compartment being positioned to receive a portion of the flow of water. In operation, water passes through valve 183 into manifold 181 and the flow is slowed as it is separated into parallel flows through the parallel-connected biocide coalescer units 184 to increase residence time for imparting electromagnetic flux in order to maximize the positive charges the electromagnetic flux imparts to the water. The output of the units 184 is comingled in manifold 186, who's output is controlled by valve 188. The entire assembly of the manifolds and biocide coalescer units is, in some examples, mounted on frame 184 which may be lifted by harness 186 onto a pad at a well site or onto the bed of a truck for transportation.

In a further example, the means for generating positive charge comprises means for treating each of the plurality of flows of water with electromagnetic flux. At least one such example is seen in FIGS. 19-28, where the means for treating each of the plurality of flows of water with electromagnetic flux comprises: a pipe and at least one electrical coil having an axis substantially coaxial with the pipe. In some such examples, the pipe consists essentially of non-conducting material. In some such examples, the pipe consists essentially of stainless steel. In a variety of examples, there is also provided a ringing current switching circuit connected to the coil. In some such examples, the ringing current switching circuit operates in a full-wave mode at a frequency between about 10 kHz to about 80 kHz.

Figure 19:
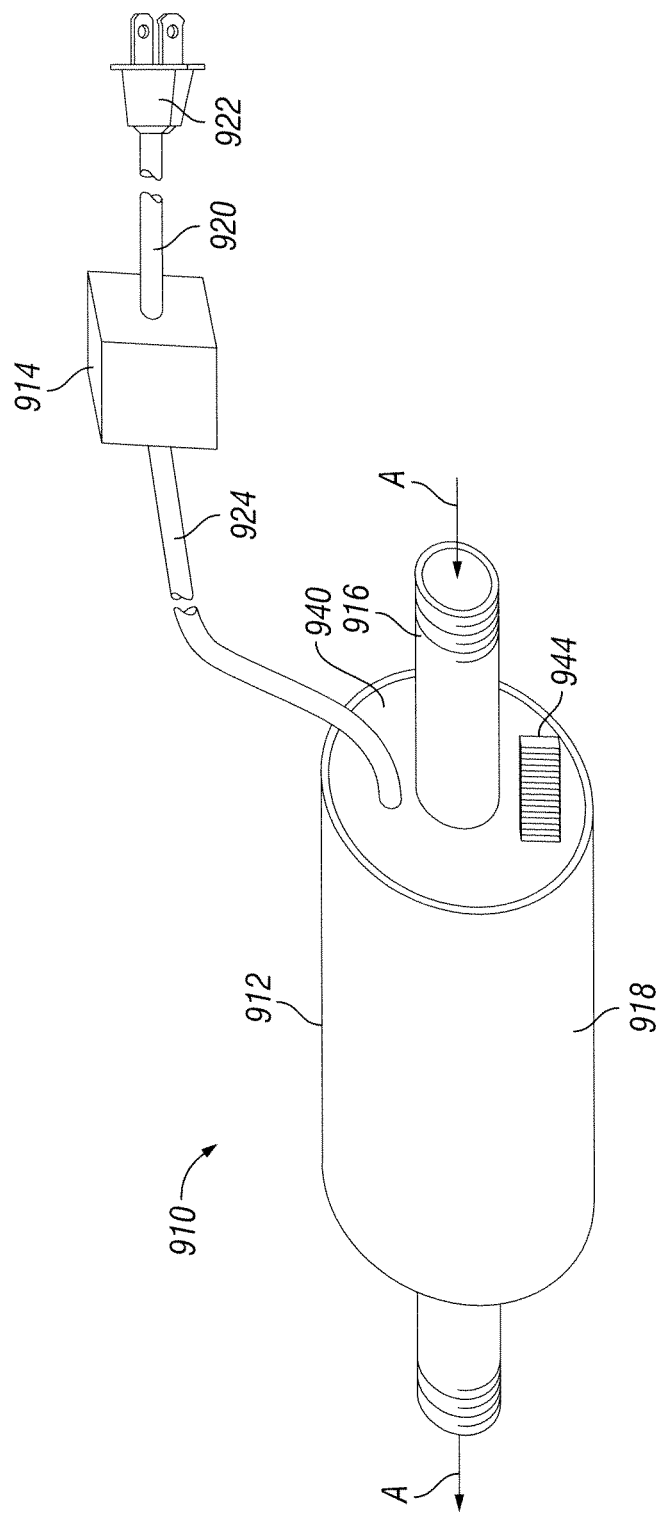
FIG. 19 is a perspective view of an apparatus embodying the invention.

Specifically, still referring to FIGS. 19-28, turning first to FIG. 19, an apparatus embodying the invention is indicated generally at 910 and comprises basically a pipe unit 912 and an alternating current electrical power supply 914. The pipe unit 912 includes a pipe 916 through which liquid to be treated passes with the direction of flow of liquid being indicated by the arrows A. The pipe 916 may be made of various materials, but as the treatment of the liquid effected by the pipe unit 912 involves the passage of electromagnetic flux through the walls of the pipe and into the liquid passing through the pipe, the pipe is preferably made of a non-electrical conducting material to avoid diminution of the amount of flux reaching the liquid due to some of the flux being consumed in setting up eddy currents in the pipe material. Other parts of the pipe unit 912 are contained in or mounted on a generally cylindrical housing 918 surrounding the pipe 916.

The pipe unit 912 is preferably, and as hereinafter described, one designed for operation by a relatively low voltage power source, for example, a power source having a voltage of 911 V(rms) to 37 V(rms) and a frequency of 60 Hz and, therefore, the illustrated power supply 914 is a voltage step down transformer having a primary side connected to an input cord 920 adapted by a plug 922 for connection to a standard mains, such as one supplying electric power at 120 V 60 Hz or 240 V 60 Hz, and having an output cord 924 connected to the secondary side of the transformer and supplying the lower voltage power to the pipe unit 912. The pipe unit 912 may be designed for use with pipes 916 of different diameter and the particular output voltage provided by the power source 914 is one selected to best suit the diameter of the pipe and the size and design of the related components of the pipe unit.

Figure 20:
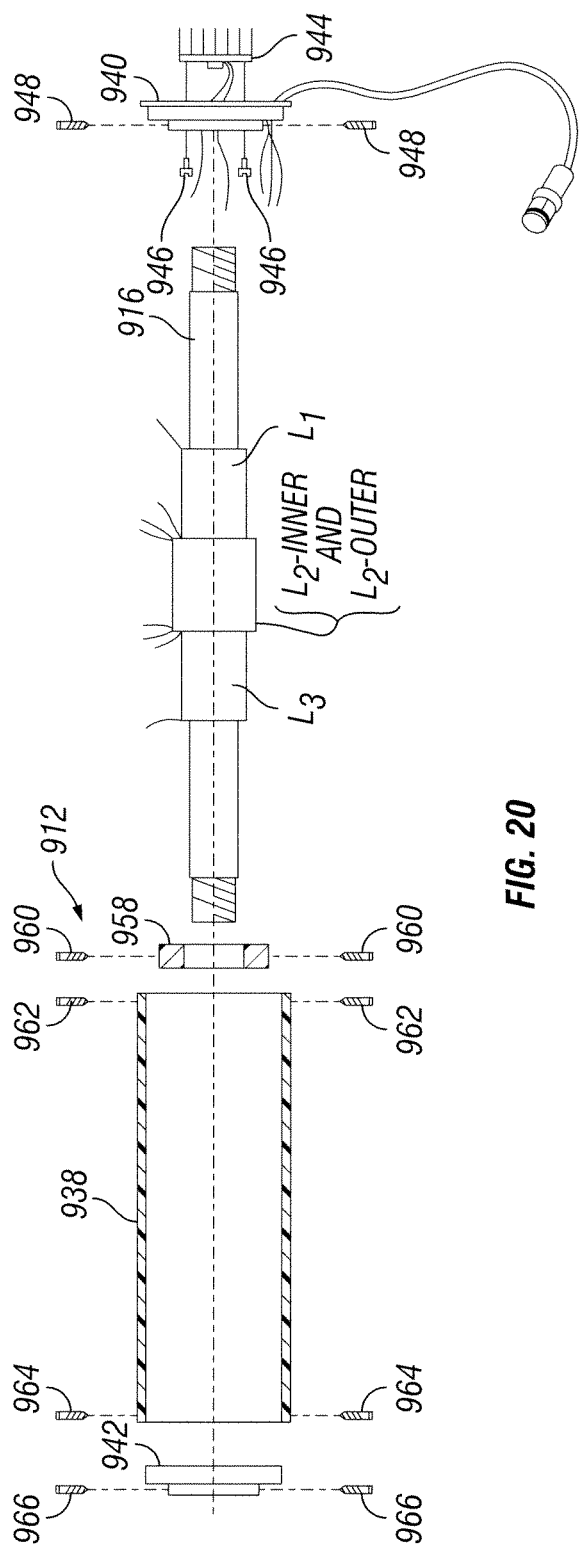
FIG. 20 is an exploded view of the pipe unit of the apparatus of FIG. 19.
Figure 21:
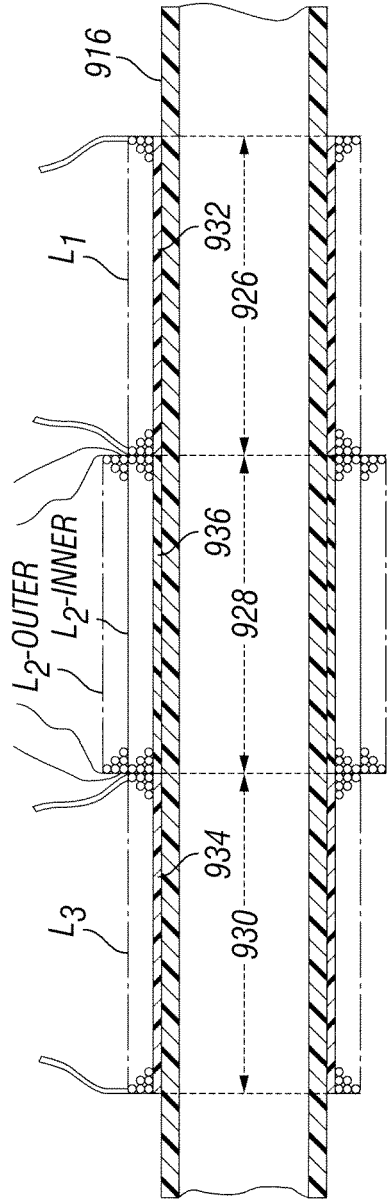
FIG. 21 is a longitudinal cross sectional view taken through the pipe unit of FIG. 19.

The pipe unit 912, in addition to the housing 918 and pipe 916, consists essentially of an electrical coil means surrounding the pipe and a switching circuit for controlling the flow of current through the coil means in such a way as to produce successive periods of ringing current through the coil means and resultant successive ringing periods of electromagnetic flux passing through the liquid in the pipe 916. The number, design and arrangement of the coils making up the coil means may vary, and by way of example in FIGS. 20 and 21 the coil means is shown to consist of four coils, $L_1$, $L_2$-outer, $L_2$-inner and $L_3$ arranged in a fashion similar to that of U.S. Pat. No. 5,702,600, incorporated herein by reference for all purposes. The coils, as shown in FIGS. 20 and 21, are associated with three different longitudinal sections 926, 928 and 930 of the pipe 916. That is, the coil $L_1$ is wound onto and along a bobbin 932 in turn extending along the pipe section 926, the coil $L_3$ is wound on and along a bobbin 934 itself extending along the pipe section 930, and the two coils $L_2$-inner and $L_2$-outer are wound on a bobbin 936 itself extending along the pipe section 928, with the coil $L_2$-outer being wound on top of the coil $L_2$-inner. The winding of the two coils $L_2$-inner and $L_2$-outer on top of one another, or otherwise in close association with one another, produces a winding capacitance between those two coils which forms all or part of the capacitance of a series resonant circuit as hereinafter described.

Referring to FIG. 20, the housing 918 of the pipe unit 912 is made up of a cylindrical shell 938 and two annular end pieces 940 and 942. The components making up the switching circuit are carried by the end piece 940 with at least some of them being mounted on a heat sink 944 fastened to the end piece 940 by screws 946. In the assembly of the pipe unit 912, the end piece 940 is first slid onto the pipe 916, from the right end of the pipe as seen in FIG. 20, to a position spaced some distance from the right end of the pipe, and is then fastened to the pipe by set screws 948. The three coil bobbins 932, 936 and 934, with their coils, are then moved in succession onto the pipe 916 from the left end of the pipe until they abut one another and the end piece 940, with adhesive applied between the bobbins and the pipe to adhesively bond the bobbins to the pipe. An annular collar 950 is then slid onto the pipe from the left end of the pipe into abutting relationship with the coil $L_3$ and is fastened to the pipe by set screws 960, 960. The shell 938 is then slid over the pipe and fastened at its right end to the end piece 940 by screws 962, 962. Finally, the end piece 942 is slid over the pipe 916, from the left end of the pipe, and then fastened to the shell 938 by screws 964 and to the pipe by set screws 966.

Figure 22:
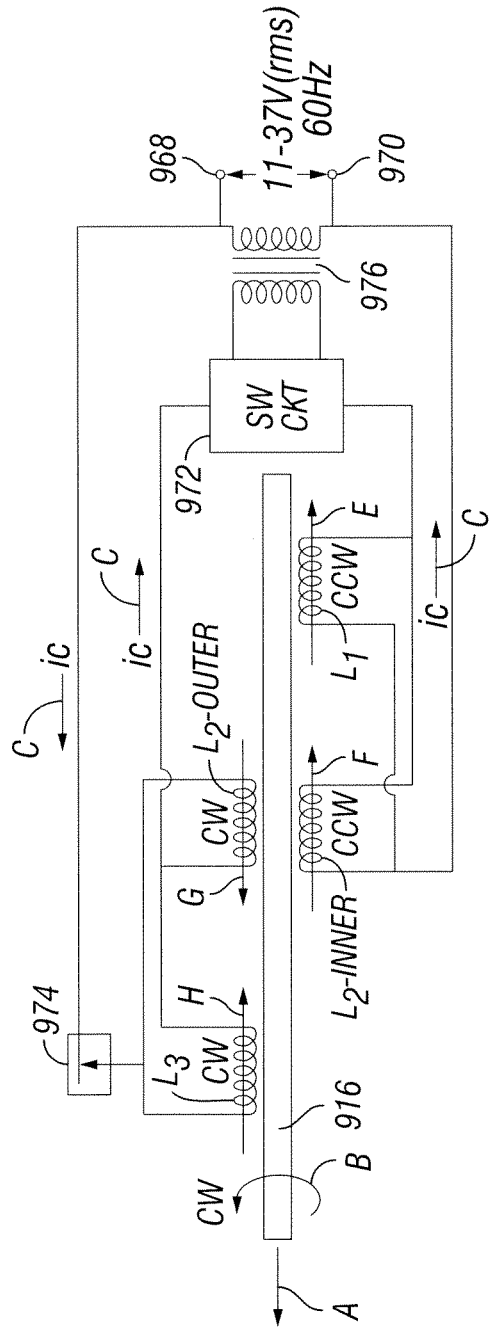
FIG. 22 is a simplified circuit diagram of the pipe unit of FIG. 19.

The basic wiring diagram for the pipe unit 912 is shown in FIG. 22. The input terminals connected to the power source 914 are indicated at 968 and 970. A connecting means including the illustrated conductors connects these input terminals 968 and 970 to the coils and to the switching circuit 972 in the manner shown with the connecting means including a thermal overload switch 974. The arrow B indicates the clockwise direction of coil winding, and in keeping with this reference the coil $L_3$ and the coil $L_2$-outer are wound around the pipe 916 in the clockwise direction and the coils $L_1$ and $L_2$-inner are wound around the pipe in the counterclockwise direction. Taking these winding directions and the illustrated electrical connections into account, it will be understood that when a current $i_c$ flows through the coils in the direction indicated by the arrows C, the directions of the magnetic fluxes passing through the centers of each of the coils, and therefore through the liquid in the pipe, are as shown by the arrows E, F, G and H in FIG. 22. That is, the fluxes passing through the centers of the coils $L_1$, $L_2$-inner and $L_3$ move in one direction longitudinally of the pipe and the flux passing through the center of the coil $L_2$-outer moves in the opposite direction. Depending on the design of the switching circuit 972, it may be necessary or desirable to provide a local ground for the switch circuit 972 and when this is the case, the switching circuit may be connected with the input terminals 968 and 970 through an isolation transformer 976, as shown in FIG. 22.

Figure 23:
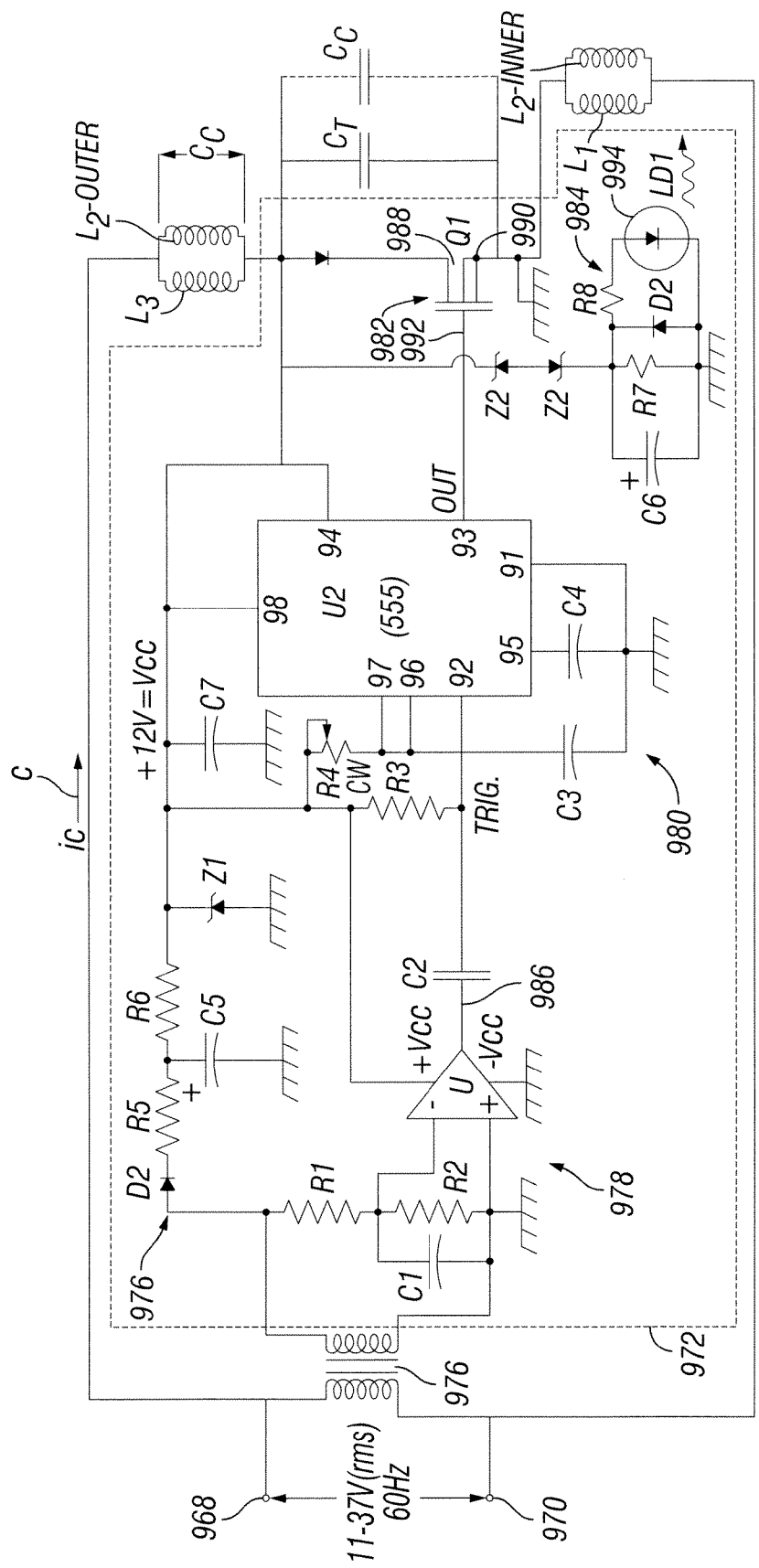
FIG. 23 is a detailed schematic diagram of the electrical circuit of the pipe unit of FIG. 19.

FIG. 23 is a wiring diagram showing in greater detail the connecting means and switching circuit 972 of FIG. 22. Referring to FIG. 23, the switching circuit 972 includes a 12 V power supply subcircuit 976, a comparator subcircuit 978, a timer subcircuit 980, a switch 982 and an indicator subcircuit 984.

The components D2, R5, C5, R6 and Z1 comprise the 12 V DC power supply subcircuit 976 which powers the other components of the trigger circuit. Resistors R1 and R2 and the operational amplifier U1 form the comparator subcircuit 978. The resistors R1 and R2 form a voltage divider that sends a signal proportional to the applied AC voltage to the operational amplifier U1. The capacitor C1 serves to filter out any "noise" voltage that might be present in the AC input voltage to prevent the amplifier U1 from dithering. The amplifier U1 is connected to produce a "low" (zero) output voltage on the line 986 whenever the applied AC voltage is positive and to produce a "high" (+12 V) output when the AC voltage is negative.

When the AC supply voltage crosses zero and starts to become positive, the amplifier U1 switches to a low output. This triggers the 555 timer chip U2 to produce a high output on its pin 93. The capacitor C2 and R3 act as a high-pass filter to make the trigger pulse momentary rather than steady. The voltage at pin 92 of U2 is held low for about one-half millisecond. This momentary low trigger voltage causes U2 to hold a sustained high (+12 V) on pin 93.

The switch 982 may take various different forms and may be a sub-circuit consisting of a number of individual components, and in all events it is a three-terminal or triode switch having first, second and third terminals 988, 990 and 992, respectively, with the third terminal 992 being a gate terminal and with the switch being such that by the application of electrical signals to the gate terminal 992 the switch can be switched between an ON condition at which the first and second terminals are closed relative to one another and an OFF condition at which the first and second terminals are open relative to one another. In the preferred and illustrated case of FIG. 23, the switch 982 is a single MOSFET (Q1). The MOSFET (Q1) conducts, that is sets the terminals 988 and 990 to a closed condition relative to one another, as soon as the voltage applied to the gate terminal 992 becomes positive as a result of the input AC voltage appearing across the input terminals 968 and 970 becoming positive. This in turn allows current to build up in the coils $L_1$, $L_2$-inner, $L_2$-outer, and $L_3$. When the time constant formed by the product of the resistor R4 and the capacitor C3 has elapsed, the 555 chip U2 reverts to a low output at pin 93 turning the MOSFET (Q1) to its OFF condition. When this turning off of (Q1) occurs, any current still flowing in the coils is diverted to the capacitance which appears across the terminals 988 and 990 of (Q1). As shown in FIG. 23, this capacitance is made up of the wiring capacitance $C_c$ arising principally from the close association of the two coils $L_2$-inner and $L_2$-outer. This winding capacitance may of itself be sufficient for the purpose of creating a useful series resonant circuit with the coils, but if additional capacitance is needed, it can be supplied by a separate further tuning capacitor ($C_t$).

When the switch (Q1) turns to the OFF or open condition, any current still flowing in the coils is diverted to the capacitance ($C_c$ and/or $C_1$) and this capacitance in conjunction with the coils and with the power source form a series resonant circuit causing the current through the coils to take on a ringing wave form and to thereby produce a ringing electromagnetic flux through the liquid in the pipe 916. By adjusting the variable resistor R4, the timing of the opening of the switch (Q1) can be adjusted to occur earlier or later in each operative half cycle of the AC input voltage. Preferably, the circuit is adjusted by starting with R4 at its maximum value of resistance and then slowly adjusting it toward lower resistance until the LED indicator 994 of the indicator subcircuit 984 illuminates. This occurs when the peak voltage developed across the capacitance ($C_c$ and/or $C_t$) exceeds 150 V at which voltage the two Zener diodes Z2 can conduct. The Zener diodes charge capacitor 962 and the resulting voltage turns on the LED 994. When this indicator LED lights, the adjustment of the resistor R4 is then turned in the opposite direction until the LED just extinguishes, and this accordingly sets the switch (Q1) to generate a 150 V ringing signal.

Figure 24:
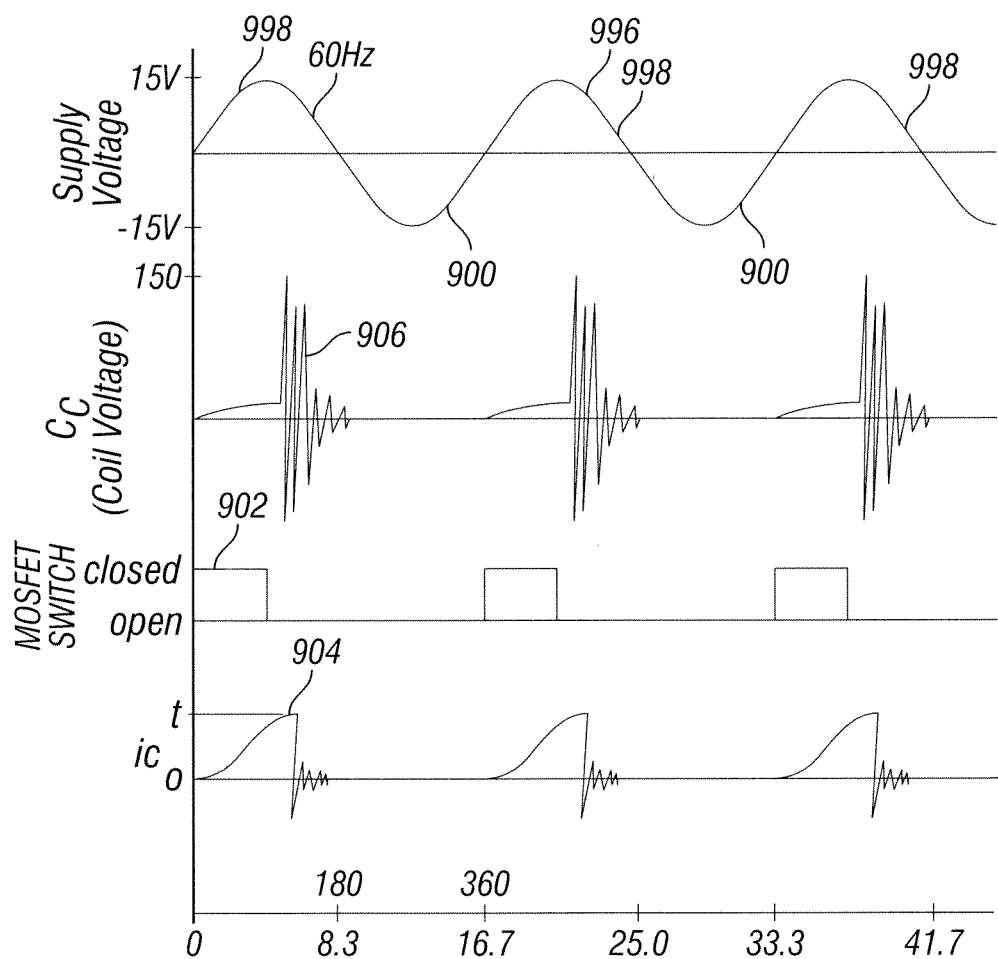
FIG. 24 is a diagram showing certain wave shapes produced by the pipe unit of FIG. 19 during operation.

FIG. 24 illustrates the function of the circuit of FIG. 23 by way of wave forms which occur during the operation of the circuit. Referring to this Figure, the wave form 996 is that of the AC supply voltage applied across the input terminals 968 and 970, the voltage being an alternating one having a first set of half cycles 998 of positive voltage alternating with a second set of half cycles 900 of negative voltage. The circuit of FIG. 23 is one which operates in a half wave mode with periods of ringing current being produced in the coils of the pipe unit only in response to each of the positive half cycles 998. The wave form 902 represents the open and closed durations of the switch (Q1), and from this it will be noted that during each positive half cycle 998 of the supply voltage the switch (Q1) is closed during an initial portion of the half cycle and is opened at a time well in advance of the end of that half cycle (with the exact timing of this occurrence being adjustable by the adjustable resistor R4).

The opening and closing of the switch (Q1) produces the current wave form indicated at 904 in FIG. 24 which for each positive half cycle of the supply voltage is such that the current through the coils increases from zero during the initial portion of the half cycle, during which the switch (Q1) is closed, and then upon the opening of the switch (Q1) the current rings for a given period of time. The voltage appearing across the coils of the pipe unit is such as shown by the wave form 906 of FIG. 24, with the voltage upon the opening of the switch (Q1) taking on a ringing shape having a maximum voltage many times greater than the voltage provided by the power supply 914.

The frequency of the ringing currents produced in the coils and of the ringing voltages produced across the coils can be varied by varying the capacitance ($C_c$ and/or $C_t$) appearing across the switch (Q1) and is preferably set to be a frequency within the range of 10 kHz to 80 kHz.

Parameters of the apparatus of FIGS. 19-24, including nominal pipe size, arrangement of coils in terms of number of turns, gage and length, tuning capacitor capacitance and associated nominal power supply voltage are given in the form of a chart in FIG. 28.

Figure 25:
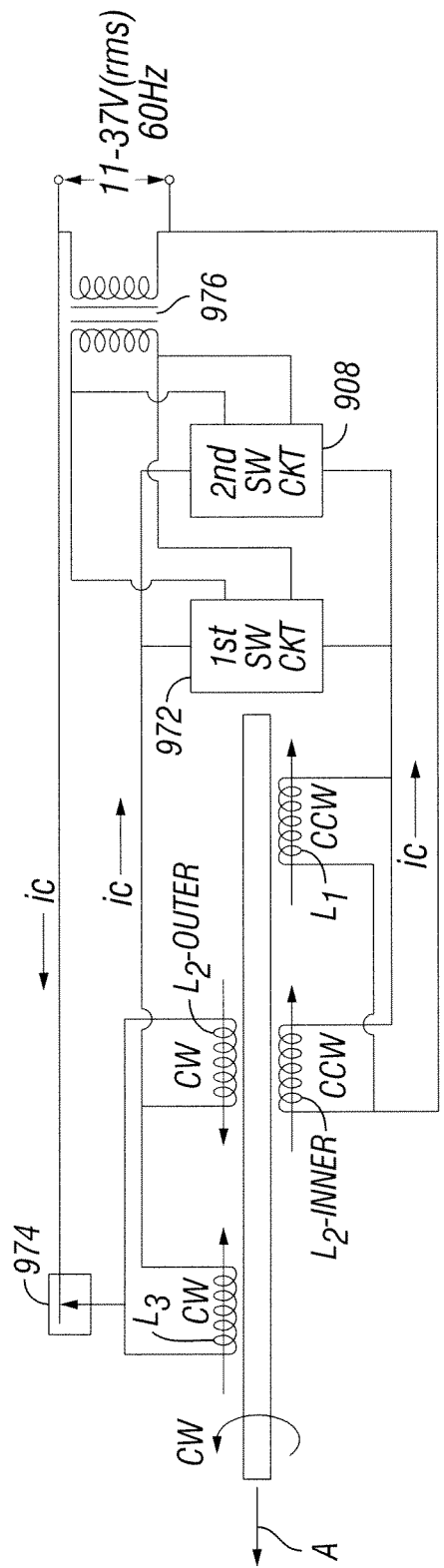
FIG. 25 is a circuit diagram similar to FIG. 4 but showing a modified embodiment of the invention.

As mentioned above, the switching circuit illustrated and described in connection with FIGS. 22, 23 and 24 is one which is operable to produce one period of ringing current and ringing voltage for each alternate half cycle of the applied supply voltage. However, if wanted, the switching circuit can also be designed to operate in a full wave mode wherein a period of ringing current and of ringing voltage is produced for each half cycle of the supply voltage. As shown in FIG. 25, this can be accomplished by modifying the circuit of FIG. 22 to add a second switching circuit 908 which is identical to the first switching circuit 972 except for facing current wise and voltage wise in the opposite direction to the first circuit 972. That is, in FIG. 25 the first circuit 972 operates as described above during each positive half cycle of the applied voltage and the second circuit 908 operates in the same way during the negative half cycles of the applied voltage, and as a result, the number of periods of current and voltage ringing over a given period of time is doubled in comparison to the number of periods produced in the same period of time by the circuit of FIG. 22.

Figure 26:
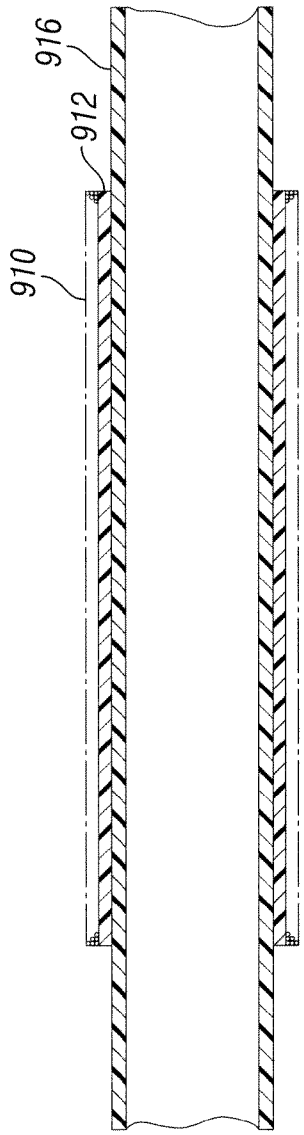
FIG. 26 is a view similar to FIG. 21 but showing a modified embodiment of the invention in which the pipe unit has only one coil surrounding the liquid flow pipe.
Figure 27:
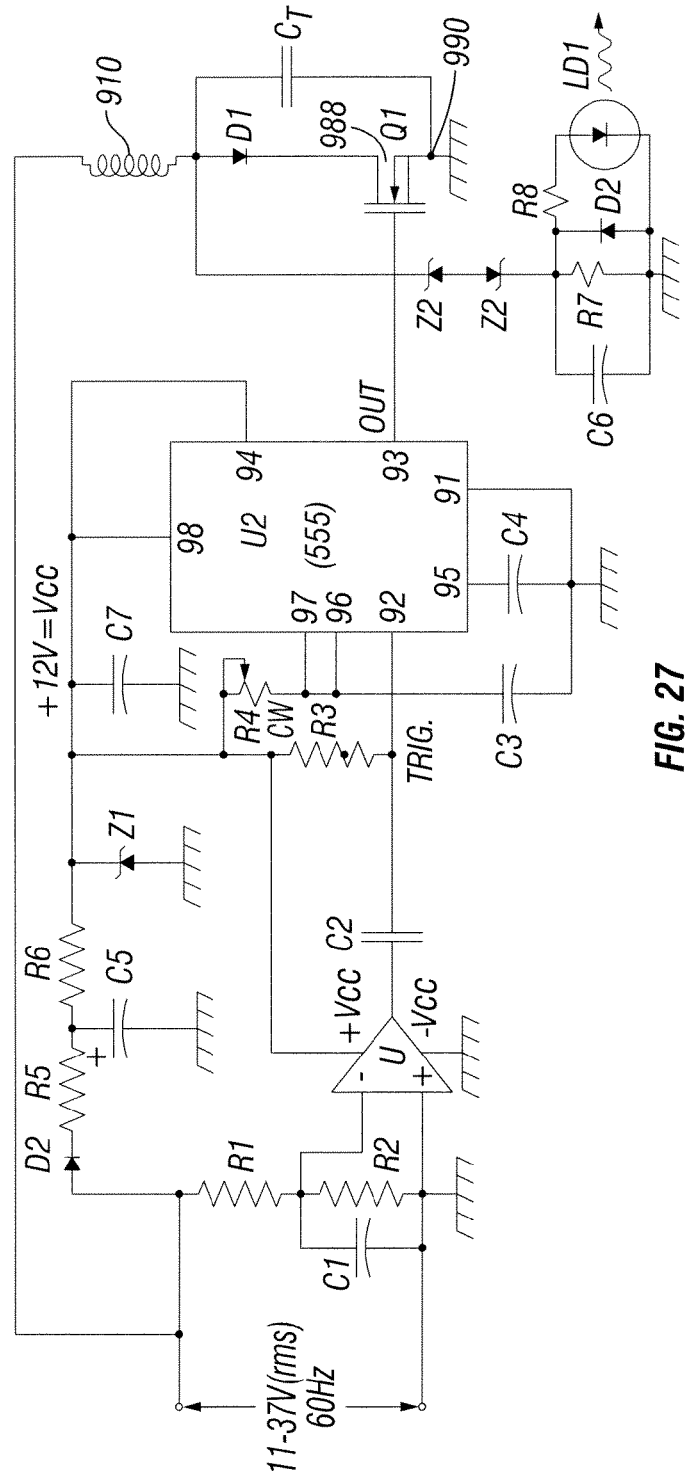
FIG. 27 is a detailed circuit diagram similar to FIG. 23 but showing an electrical circuit for use with the pipe unit of FIG. 27.

Also, as mentioned above, the number of coils used in the pipe unit 912 may be varied and if wanted, the pipe unit 912 may be made with only one coil without departing from the invention. FIGS. 26 and 27 relate to such a construction with FIG. 26 showing the pipe unit to have a single coil 910 wound on a bobbin 912 and surrounding the pipe 916. The switching circuit used with the single coil pipe unit of FIG. 26 is illustrated in FIG. 27 and is generally similar to that of FIG. 23 except, that because of the single coil 910 producing no significant wiring capacitance, it is necessary to provide the tuning capacitor ($C_t$) across the first and second terminals 988 and 990 of the switch (Q1). Further, since the coil means is made up of the single coil 910 and located entirely on one side of the switch (Q1), it is unnecessary to provide the isolation transformer 976 of FIG. 23 to establish a local ground for the components of the switching circuit.

In still a further example, seen in FIG. 18 means for co-mingling comprises a manifold 186 having input ports for a plurality of flows of positively-charged water from multiple means for generating positive charge 184 and an output port connected to valve 188 directing an output flow of water having positive charges therein to a blender for use in well fracturing operations. In a variety of examples, the majority of the suspended solids are less than about 100 microns. In some such examples substantially all the suspended solids are less than about 100 microns. In a more limited set of examples, the majority of the suspended solids are less than about 10 microns. In an even more limited set of examples, substantially all the suspended solids are less than about 10 microns.

Figure 17:
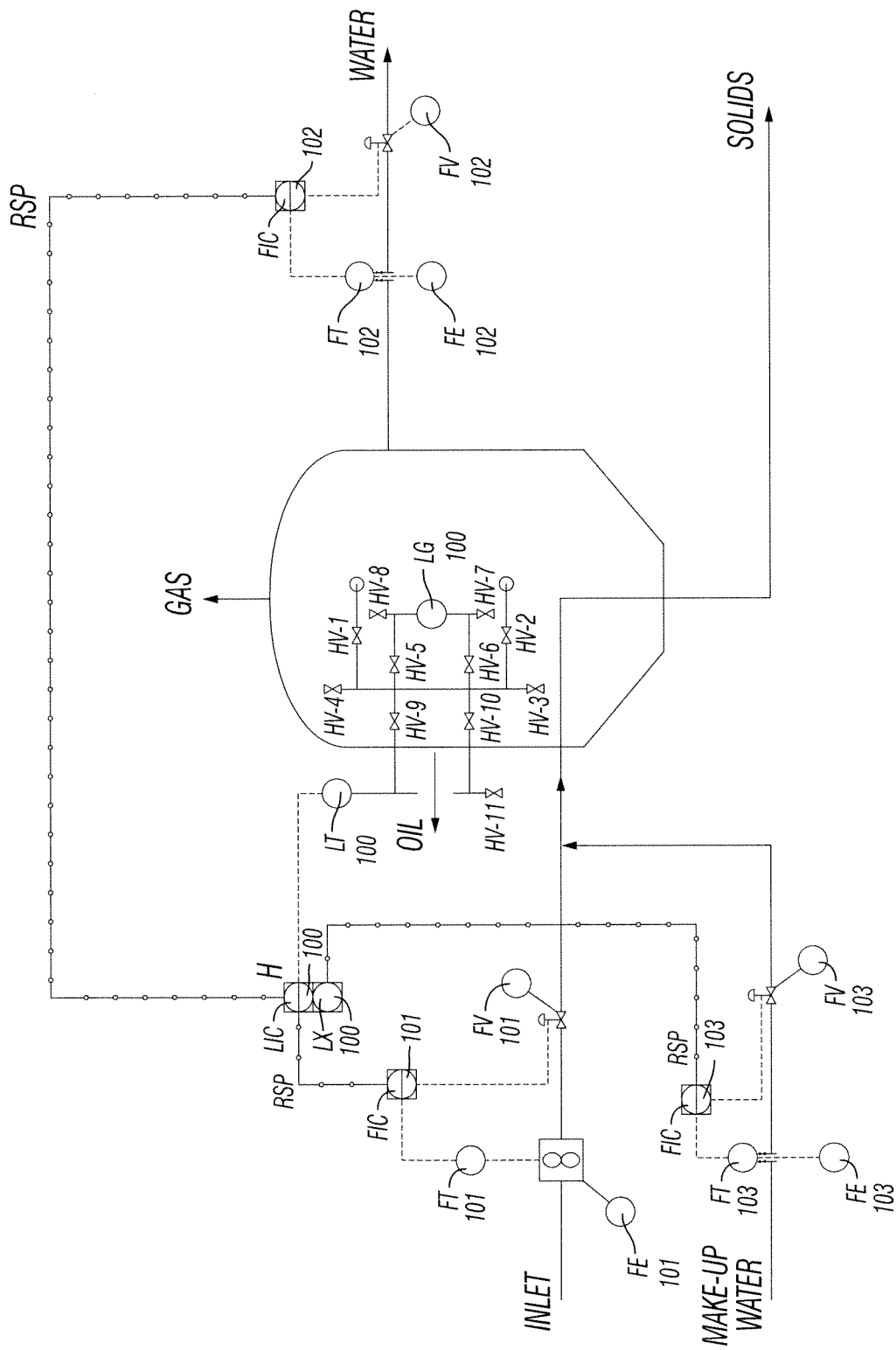
FIG. 17 is a schematic of a control system useful according to examples of the invention.

Referring now to FIGS. 16 and 17, a system is shown for controlling of water/liquid hydrocarbon interface in the three-phase separator, where in the system comprises: means for establishing a water/liquid hydrocarbon interface in a three-phase separator; means for measuring the water/liquid hydrocarbon interface in the three-phase separator, wherein a water/liquid hydrocarbon interface measurement signal results; means for comparing the water/liquid hydrocarbon interface measurement signal to a set point, wherein a comparison signal results; means for reducing the flow into the three-phase separator of hydrocarbon well fracture water when the comparison signal indicates the water/liquid hydrocarbon interface is above the set point and for increasing flow into the three-phase separator when the comparison signal indicates the water/liquid hydrocarbon interface is below the set point, wherein the increasing flow comprises hydrocarbon well fracture water from and make-up water.

Figure 14A:
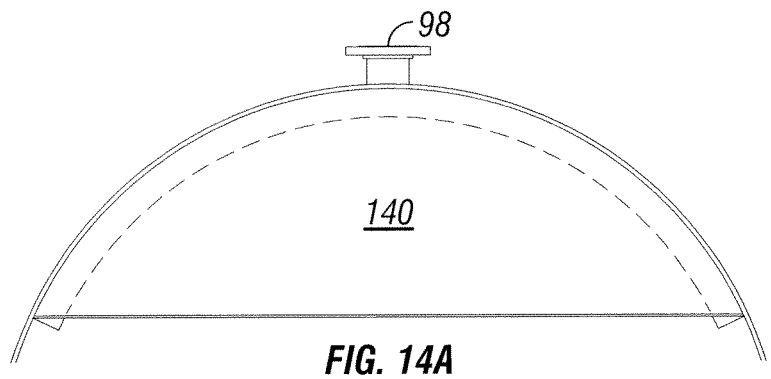
FIG. 14A is a top view of a component of an example of the invention.
Figure 14B:
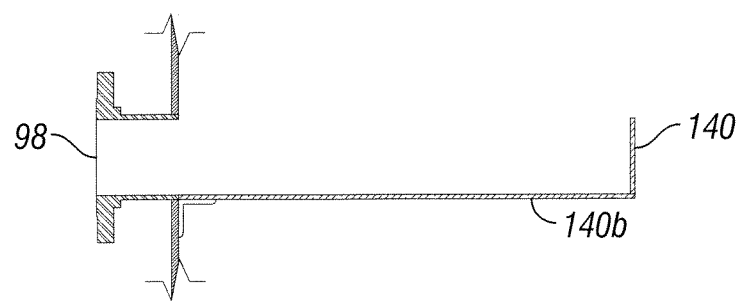
FIG. 14B is a section view of the component of FIG. 14A.

In at least one example, best seen in FIGS. 14A and 14B, the means for establishing a water/liquid hydrocarbon interface comprises a diaphragm wier 140, and, ideally, the oil-water interface is established at the wier-bottom 140b. Controlled by flow meters and control valves seen in FIGS. 15 and 16.

Referring now to FIG. 17, a more detailed example is seen of the interface level control of a three phase, four material separator is provided. As seen in the Figure, inlet flow of flow-back water to the separator is measured by turbine meter (FE-101)/transmitter (FT-101) and controlled by flow control valve (FV-101) via flow controller (FIC-101). Make-up water inlet flow is measured by orifice plate (FE-103)/dP transmitter (FT-103) and controlled by flow control valve (FV-103) via flow controller (FIC-103). Water outflow is measured by orifice plate (FE-102)/dP transmitter (FT-102) and controlled by flow control valve (FV-102) via flow controller (FIC-102). The oil and water interface level in the separator is measured by a magnetic level gauge (LG-100) and also by continuous capacitance level transmitter (LT-100). Both level devices are mounted on an external level bridle made up of 2 inch diameter pipe. The bridle comprises manual valves (HV-1, HV-2, HV-3, HV-4, HV-5, HV-6, HV-9, and HV-10) for maintenance on the bridle and attached instrumentation as will occur to those of skill in the art. HV-1 and HV-2 are used to isolate the bridle from the process. HV-3 and HV-4 are used to drain and vent the bridle respectively. HV-5 and HV-6 are used to isolate the level gauge from the process. HV-9 and HV-10 are used to isolate the level transmitter chamber from the process. Each instrument on the bridle is equipped with valves for maintenance. HV-7 and HV-8 are a part of the level gauge and are used to drain and vent the level gauge respectively. HV-11 is a part of the level transmitter chamber and is used to drain the chamber.

The water/liquid hydrocarbon interface (aka "oil/water interface") level in the separator is maintained by level controller (LIC-100) with cascade control to flow-back inlet flow controller (FIC-101), make-up water inlet flow controller (FIC-103) and water outflow controller (FIC-102). Cascade control is accomplished by the level controller sending a remote set point (RSP) to the associated flow controllers and resetting their set points to maintain interface level.

All controllers are set for steady state condition to maintain normal liquid level (NLL=50%). Set points for individual controllers are determined by desired capacity and separator sizing.

In one operational example, as the interface level increases, the level controller resets the water outflow controller to throttle open while resetting the flow-back inlet flow controller to throttle back to maintain normal liquid level. An high liquid level (HLL=80%) alarm is triggered from an interface level transmitter analog signal to an operator, allowing the operator should take appropriate actions to regain control of the interface level or operating conditions.

As interface level decreases, the level controller resets the water outflow controller to throttle back while the resetting flow-back inlet flow controller to throttle open to maintain normal liquid level. If interface level decreases to a low liquid level (LLL=10%), the system places the make-up water flow controller on cascade control from the interface level controller by software switch LX-100.

Figure 29:
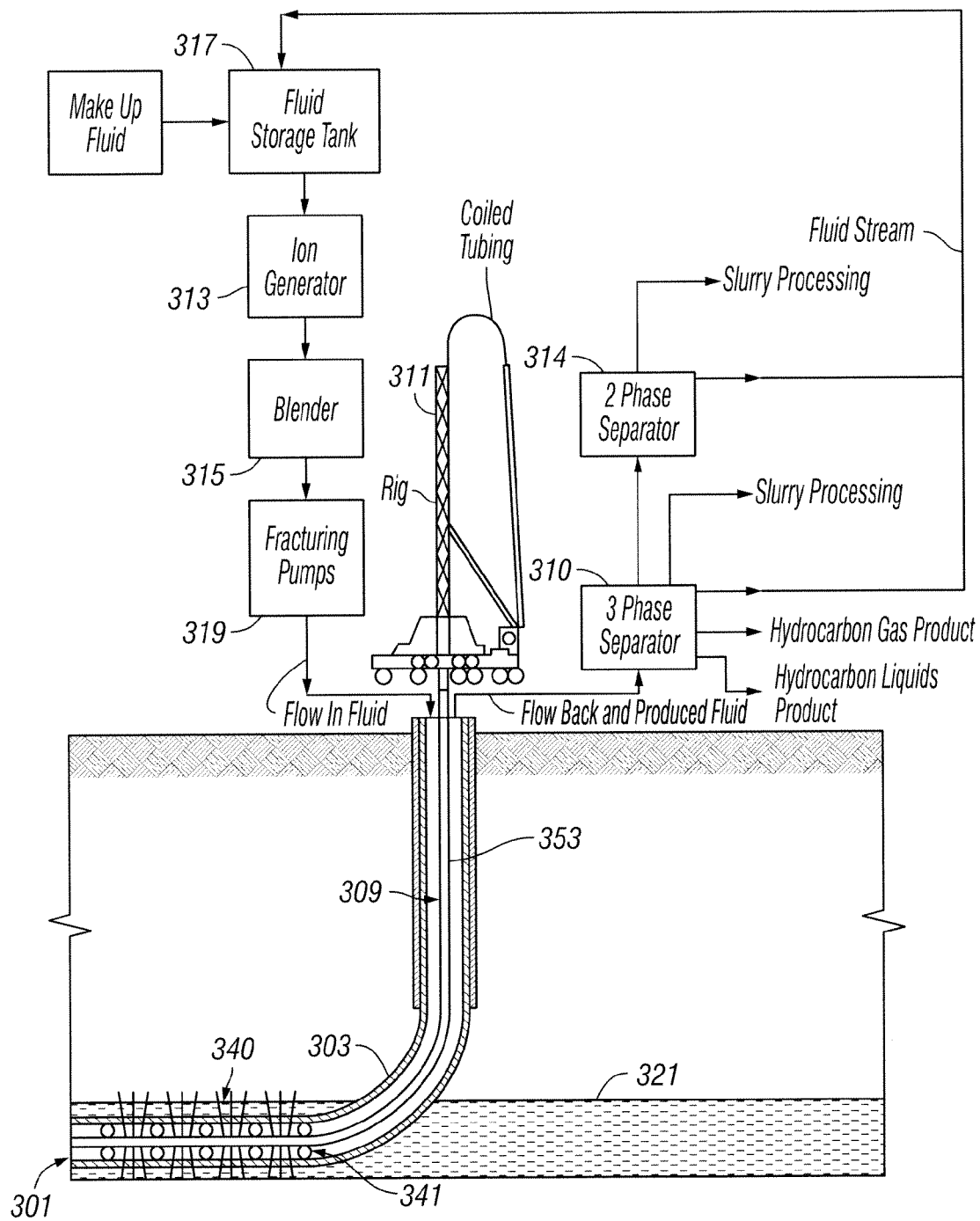
FIG. 29 is a diagram of a well site showing the flow of various materials used in various examples of the invention, including pumping ionized water into a formation.

Referring now to FIG. 29, a flow diagram of the use of an example of the invention in a hydrocarbon well having a well bore 301 with wellbore cemented casing 303 passing through fracture zones 340 that are isolated by packers 341. Coil tubing 309 is inserted by rig 311 for fracture operations known to those of skill in the art. Perforations 356 are made into the shale layer 321. As part of the perforation and plugging operation, packers 341 are placed in the borehole to isolate the different fracture zones 340. The coil tubing 309 is inserted into the targeted areas where fracturing is desired. A fluid, in this case largely comprising of water, is pumped through an ion generator 313. The ion generator 313 uses electromagnetic fields of influence described herein to generate ionization within the fluid. This now ionized fluid 353 is pumped via fracturing pumps 319 into the fracture zones 340.

Figure 30:
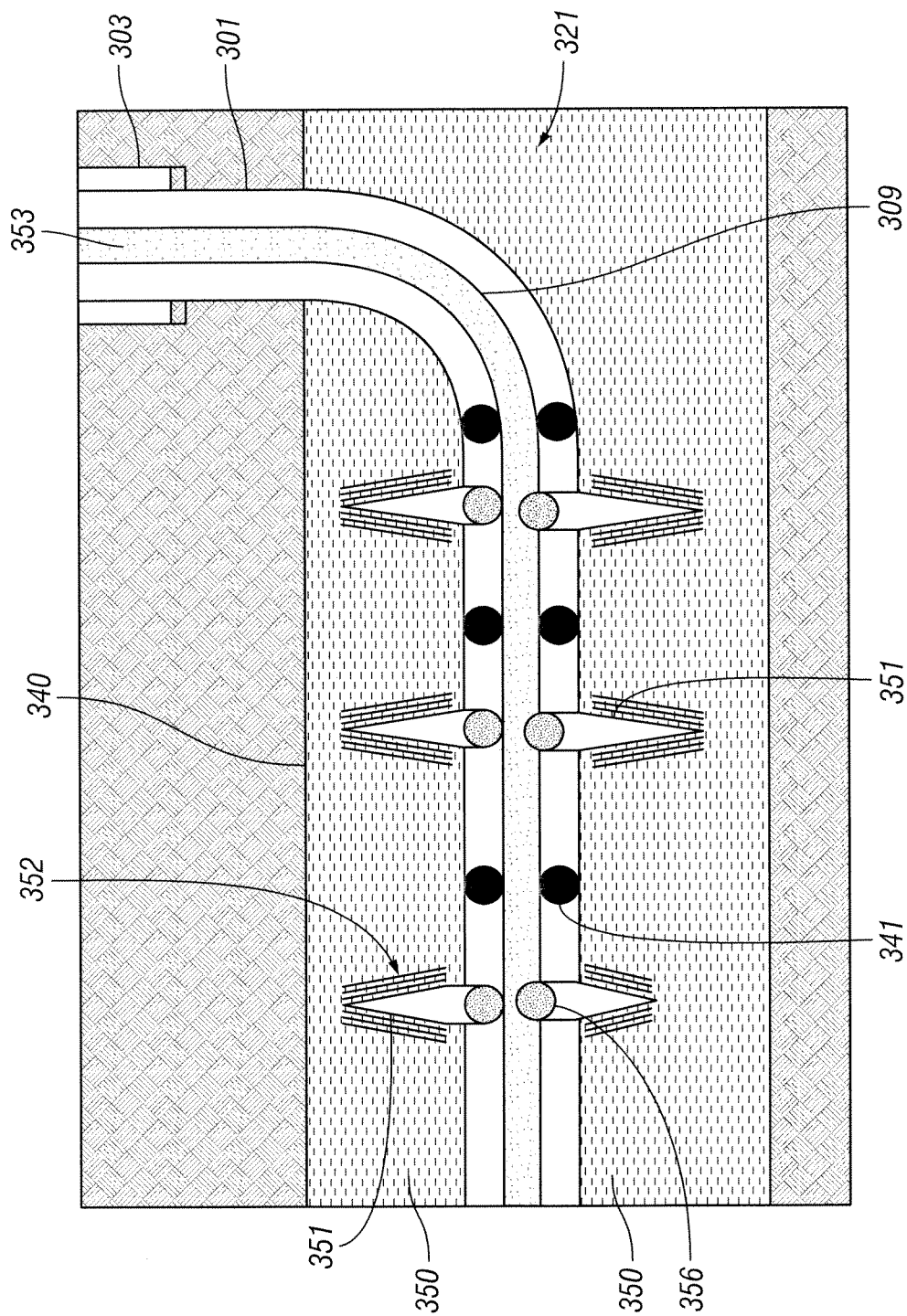
FIG. 30 is a diagram of a perforation zone being exposed to an ionized fluid.

The ionized fluid 353 is pumped into the fissures 351 as depicted in FIG. 30. The ionized fluid 353 is pressurized sufficiently to grow and enlarge the fissure 351. The ionized fluid 353 is held at pressure for a predetermined amount of time. While at pressure, the ionized fluid 353 interacts with the shale layer 321, in this example layered calcite 350, to create layers of aragonite crystals 352. The fracture zone 340 is depressurized by coiled tubing 309 in this example. The fracture process can vary depending on the service provider and the environment of the well. For instance, in an open hole application, a frack point system may be used instead of a perforate and plug system. These variations on the fracturing processes possible in a shale formation are well known to a person of ordinary skill in the art.

During the fracturing operation, fissures 351 within the shale layer 321 are created and/or enlarged. The fissures may be created by perforations, high pressure abrasion techniques, or other methods known in the art. These fissures 351, located in the fracture zone 340, expose layered calcite crystals 350 to the wellbore 301. When the layered calcite 350 orthorhombic crystal is exposed to the ionized fluid 353, the crystalline insoluble particle structure of the layered calcite 350 is transformed into a layered aragonite 352, having an orthorhombic crystal line shape. This layered aragonite 352 is in suspension.

Ionized fluid 353 has the ability to avoid scaling encrustation, because the particles that cause the scaling are now in suspension instead of solution. By exposing the layered calcite 350 to ionized fluid 353, the particles form faster than if no ions are present. This phenomenon decreases the size of the particles, preventing them from being large enough to cause encrustations or scaling on the exposed surface of the fissures 351.

Ionized fluid 353, in this example ionized water, also eliminates the problem of non-biological suspended particle growth because of its effect on avoiding surface nucleated precipitation. In addition, the effect of ionized water inhibits corrosion. Paracolloidal particles of calcium carbonate ($CaCO_3$) are charged by ionic adsorption, causing them to decrease in size such that they are insoluble and remain in suspension. They are transformed into suspended crystalline germs of orthorhombic aragonite of calcium carbonate and remain in suspension.

When the ionized fluid 353 in the fissures 351 at the target fracturing zones 340 is depressurized with coiled tubing, in this example, the calcium carbonate suspended particles 352, in this example, aragonite crystals, are removed from the fissures 351 with the flow back water or removed by the produced fluids from the formation.

Ionized water has the ability to avoid the buildup of non-biological matter at the fissures 351. The water is ionized via electromagnetic fields of influence, using for example a Dolphin unit as the ion generator 313, utilizing periodic low frequency waveform, thereby causing the electroporation of the signal and amplification of the ringing signal by resonance. The low power, high frequency, EM waves eventually kill or rupture the membranes of the micro-organisms within the fluid being ionized. Encapsulation of organic debris also occurs as a result of these reactions. The micro-organisms cannot reproduce themselves to form biofilm which clog the fissures 351. The ionized fluid in this example, which is largely comprise of water, is generated by an ion generator 313 by exposing a fluid to electromagnetic fields of influence at a full wave in the frequency range of eighty kilohertz (80 kHz) to three hundred and sixty kilohertz (360 kHz). In other embodiments the frequency may simply be higher than eighty kilohertz (80 kHz). In this example, a frequency of three hundred and sixty kilohertz (360 kHz) can cause ringing in a fluid composed mostly of water. In other words, the natural frequency of the fluid is being excited. Other fluids which have different natural frequencies than water may be excited at those other natural frequencies. The composition of the fluid will determine which frequency the ion generator should operate the electromagnetic fields of influence. A frequency greater than a full wave at eighty kilohertz (80 kHz) may have the intended effect of ionizing the fluid and minimizing the present of biological organism in the fluid.

When an excess of water-borne positive ions enters a fissure 351 the positively charged ions have a phsio-chemical effect on the shale's layered calcite 350 deposits. This mineralization alters the crystalline structure of the encrustations that have been deposited within that matrix. The preferred polymorph of calcium carbonate ($CaCO_3$) is called layered calcite 350 (rhombohedral) while others polymorphs are called aragonite (orthorhombic), and vaterite (hexagonal). Ionizing water via pulsed power at high frequencies incorporates a continuously varying induced electric field driven by a specific low frequency AC waveform and a periodic pulsed signal with a specific range of mid-to-high frequencies.

The low frequency AC waveform affects the method of solid precipitation nucleation and the mode of solid precipitation crystal growth. In this way such growth results in the precipitation but does not form on surfaces but forms in bulk solution, using microscopic suspended particulate, both inorganic and organic, as seed surfaces for nucleation and particle growth. In fracturing water calcium carbonate is the primary crystalline solid precipitated in water, and is usually a surface-nucleating scale. When exposing the fissures 351 to ionized fluid 353, the calcium carbonate precipitate incorporates into itself other cations in solution including magnesium, silicon, aluminum, iron and is converted into a suspended particle together with other constituents.

The changes in crystal nucleation kinetics, together with the resulting aragonite structure, avoids the formation of surface scale and puts the crystalline structures into suspension as individual or coalesced particles. A difference in the relative value of the electromotive forces, between the higher relative positive calcium values and the lower radical values, drives the conversion from scale into suspended particles. The positively charged ionized water makes this selective change possible on the layered calcite formations surfaces when exposed by the shaped charges in subsurface shale formations. The effect is the same for both hard and soft shale.

In another example, the calcium carbonate scale layers are physically opened up by the shaped charges exploding into the well bore before the pressurized water carrying positive ions are forced into the fissures 351. The fissures 351 are pressurized with ionized fluid 353, thereby conveying positive ions to the exposed fissures 351. The ionized fluid 353 is allowed to remain in the fracture zone 340 for a few days. After a period of time the pressurized ionized water is depressurized by coiled tubing 309 and the released hydrocarbons, suspended particles 352, proppant plus other materials that a person well known in the art might expect are carried out of the fissures 351 by the flow back and produced water from the wellbore. While in these fissures 351, the positive ions in, for this example water, selectively interact with the layered calcite and change their crystalline structure from calcite (rhombohedral) into the preferred aragonite (orthorhombic) polymorph crystal form of suspended particle which the flow back water removes from the fissures 351.

The depressurization removes layers of encrustations or scale, depicted here as layers of suspended particles 352, in the fissures 351 in a layered fashion and opens up the channels by permitting a faster rate of gaseous and liquid hydrocarbons to be carried by the water flow up to the surface. This removes bottom hole pressure of the fissures, in a layered fashion, permits a greater rate of hydrocarbon flow to be achieved initially and for a longer period of time than would otherwise be possible. Calcium carbonate in solution exists as colloidal particles typically in the range of 0.01-100 um, each one having an overall electric charge known as the zeta potential. The magnitude of this potential is the force by which each particle repels the force of like charge. This force must be large enough to overcome the force of particles in approaching each other, so that Van der Waals forces bring the particles together or coalesce.

Figure 31:
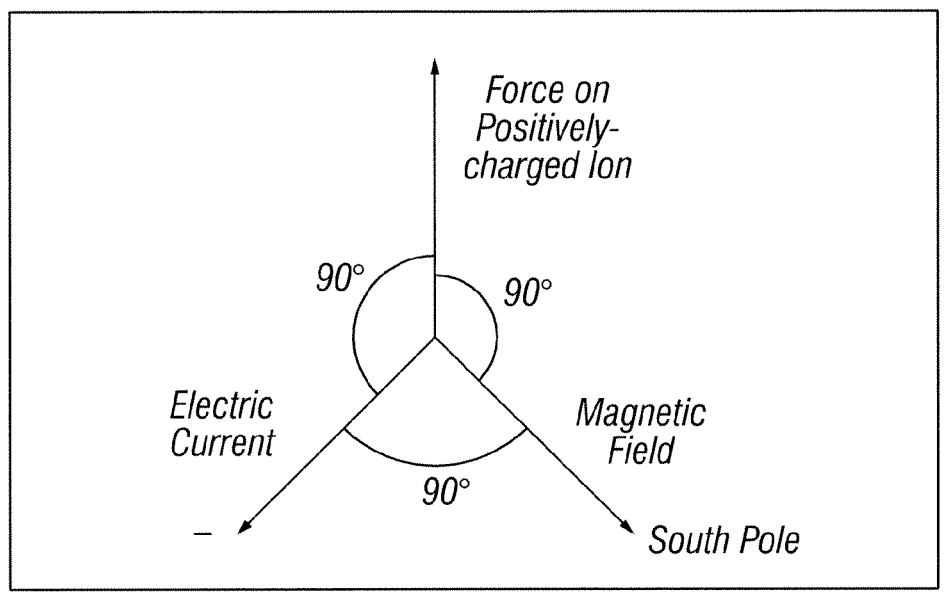
FIG. 31 is a diagram of the zeta principal and showing the positioning of fields and force.

The positive ions are carried in water together with the magnetic and electric fields and interact with a resultant zeta force generated in a direction perpendicular to the plane formed by the magnetic and electric field vectors. This is called the zeta principal as depicted in FIG. 31. This zeta force acts on the current carrying entity, the ion and slows down the suspended particles by interaction. Positively charged particles will move in a direction in accord with the Right Hand Rule, where the electrical and magnetic fields are represented by the fingers and the zeta force by the thumb. The negatively charged particles will move in the opposite direction.

The result of these zeta forces on the ions is that, in general, positively charged ions like calcium and magnesium and negatively charged ions like carbonate and sulfate are directed toward each other with increased velocity. The increased velocity results in an increase in the number of collisions between the particles, with the result being the formation of insoluble particulate matter. Once a precipitate is formed, it serves as a foundation for the further growth of the crystalline structure or polymorph of aragonite or orthorhombic, thereby creating the particles in suspension. FIG. 31 illustrates the zeta principle and illustrates the Zeta Potential Effect on suspended particles. FIG. 31 diagrams the positioning of fields and force.

The magnitude of this Zeta Potential defines the force by which each particle repels particles of like charge. This Zeta Potential Force is used to overcome the particles to approach each other so that the Van der Waals forces will brings the particles together and achieve continued growth. The induced resonating electromagnetic fields produced by the pulsed power ion generators 313, thereby reducing the zeta potential and allowing the Van der Waals forces to promote particle growth.

Achieving the desired effect of the zeta potential by the pulsed power signal is shown in FIG. 31. Zeta Potential is the particle effect that prefers one polymorph to another. This is accomplished by preventing one polymorph from growing and until the other polymorph reaches its saturation limit. The growing of a crystalline form that uses suspended particles as nucleation seeds in bulk solution also facilitates the incorporation of microbes into the suspended precipitates. This effect is called encapsulation.

The periodic pulsed signal from the ion generator 313 to the water being ionized has a micro/physical and chemical effect on the cell membranes, which is called electroporation or the chemical puncturing or rupturing of the cells which kills the micro-organisms. The pulsing signal uses the physical principle of resonating frequencies, also referred to as harmonic frequencies or ringing frequencies, to amplify the energy that is needed to ionize the fluid with relatively low power levels.

Ionized fluid 353 also has the ability to prevent the clogging of the fissures 351 with particles by flocculation. Ionized water in turn also reduces the problem of clogging due to avoiding surface nucleated precipitation. As a result of these interactions the rate of hydrocarbon flow will be faster from the bottom hole pressure. This will also extend the life of a hydrocarbon well for a longer period of time and increase the percentage of recoverable reserves from a given shale formation. This process permits a greater quantity of hydrocarbons to be extracted at faster rate of flow for both gases and liquids.

In another example, the techniques described above can be used in a reentry operation for a well. A wellsite that has been perforated and fractured previously can be reentered at a later date in order to boost its production levels. In that case the ionized fluid 353 would be introduced to a shale layer 321 by way of coiled tubing 309 in a typical fracturing reentry operation. A perforation gun may be run into the well to make perforations 356 at new locations. Packers 341 would be put into place in order to seal off new fracture zones 340. Then ionized fluid 353, comprising ionized water and proppants, would be pumped down into the formation via fracture pumps 319. The ionized fluid 353 is then pressurized in order to create and enlarge the fissures 351 that resulted from the perforation 356. Layers of suspended particles 352 would result for the exposure of ionized fluid 353 to the fissures 351. After maintaining the pressure in the fracture zone 340 of interest, the pressure would be relieved, in this case by using coiled tubing to compromise one or more of the packers 341. The relief of pressure would force the suspended particles 352 out of the fissures 351. Such a reentry job would increase the production at an already producing well and increase the overall life of the well.

It should be kept in mind that the previously described embodiments are only presented by way of example and should not be construed as limiting the inventive concept to any particular physical configuration. Changes will occur to those of skill in the art from the present description without departing from the spirit and the scope of this invention. Each element or step recited in any of the following claims is to be understood as including to all equivalent elements or steps. The claims cover the invention as broadly as legally possible in whatever form it may be utilized. Equivalents to the inventions described in the claims are also intended to be within the fair scope of the claims. All patents, patent applications, and other documents identified herein are incorporated herein by reference for all purposes.

What is claimed is:

1. A method for enhancing the recovery of hydrocarbons from a subterranean formation comprising hydrocarbon bearing shale comprising calcite having fissures therein, the method comprising:
    introducing fluid comprising positively charged ions into at least some of the fissures;
    allowing said ions to transform some calcite crystals along the fissures into aragonite crystals such that some aragonite crystals become suspended in the fluid;
    removing some of the fluid suspending the aragonite crystals from the formation;
    wherein said removal of aragonite crystals opens or expands the fissures and improves the permeability of the formation allowing an enhanced quantity and rate of hydrocarbon production from the formation;
    wherein the fluid remaining in the formation continues to transform some further calcite crystals along the fissures into aragonite crystals such that more aragonite becomes suspended in the fluid, and thereafter some of said remaining fluid suspending the aragonite is removed from the formation thereby further improving or sustaining the permeability of the formation.

2. The method of claim 1 wherein the fissures were created by fracturing the formation.

3. The method of claim 2 wherein the fluid was used in the fracturing.

4. The method of claim 1 wherein a pulsed power ion generator using electromagnetic fields of influence is used to create positive ions in the fluid.

5. The method of claim 4 wherein the electromagnetic fields of influence are pulsed at a full wave of up to three hundred and sixty times per second.

6. The method of claim 4 wherein the electromagnetic fields of influence are pulsed at a half wave of up to one hundred eighty kHz.

7. The method of claim 4 wherein the ion generator is operated at a frequency in the range of about 80 kHz to about 360 kHz.

8. The method of claim 1 further comprising removing the suspended aragonite from the fluid and reusing the fluid.

9. The method of claim 1 wherein the fluid prevents clogging of the fissures.

10. The method of claim 1 wherein the fluid acts as a biocide coalescer in the formation.

11. The method of claim 1 wherein the fluid is aqueous.

* * * * *